May 23, 1961  J. H. REYNOLDS  2,985,362
CHECKING DEVICE FOR RECORD CONTROLLED RECORDING APPARATUS
Filed July 9, 1959  18 Sheets-Sheet 1
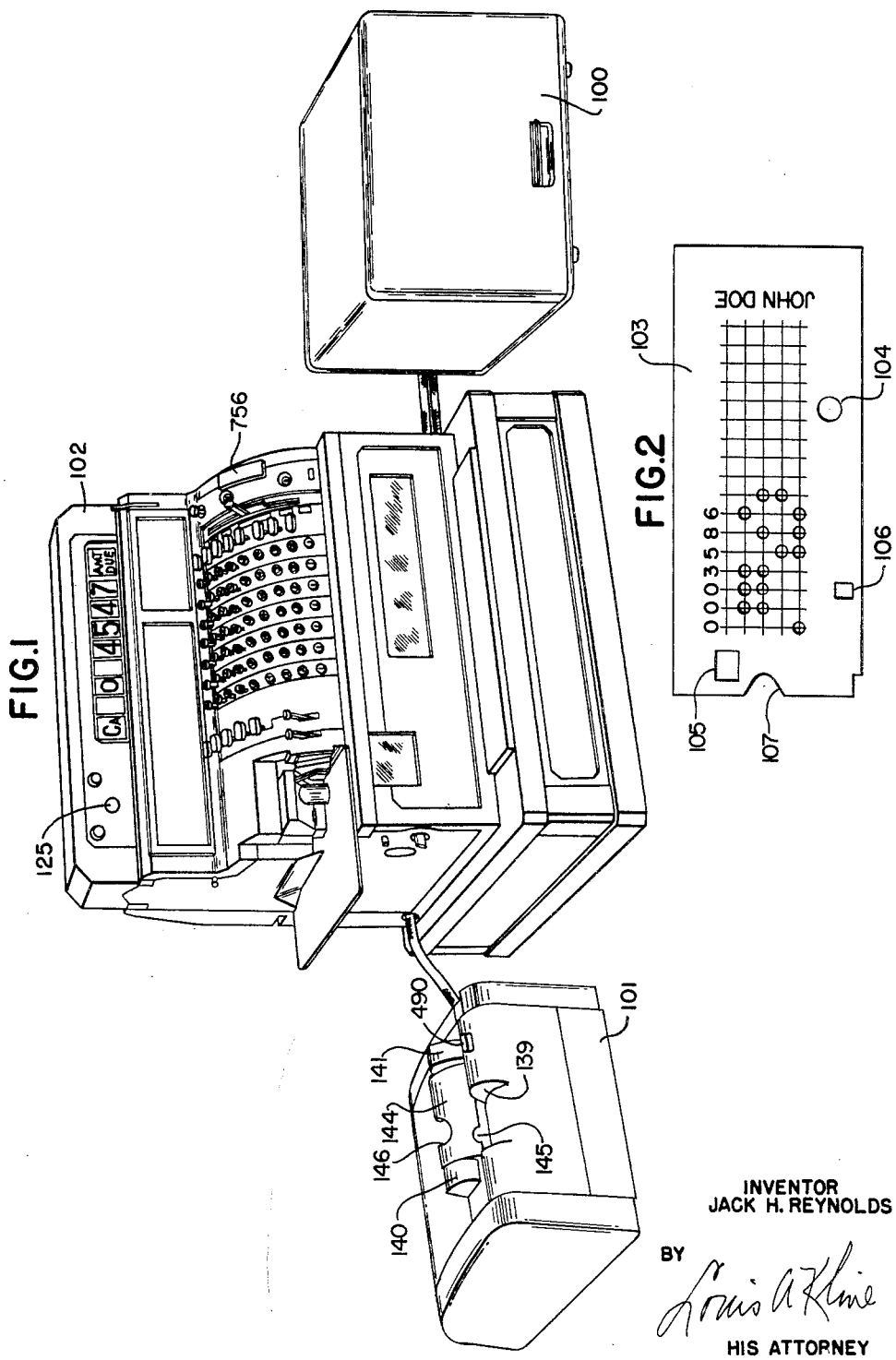
INVENTOR
JACK H. REYNOLDS
BY
*Louis A. Kline*
HIS ATTORNEY May 23, 1961 J. H. REYNOLDS 2,985,362
CHECKING DEVICE FOR RECORD CONTROLLED RECORDING APPARATUS
Filed July 9, 1959 18 Sheets-Sheet 2
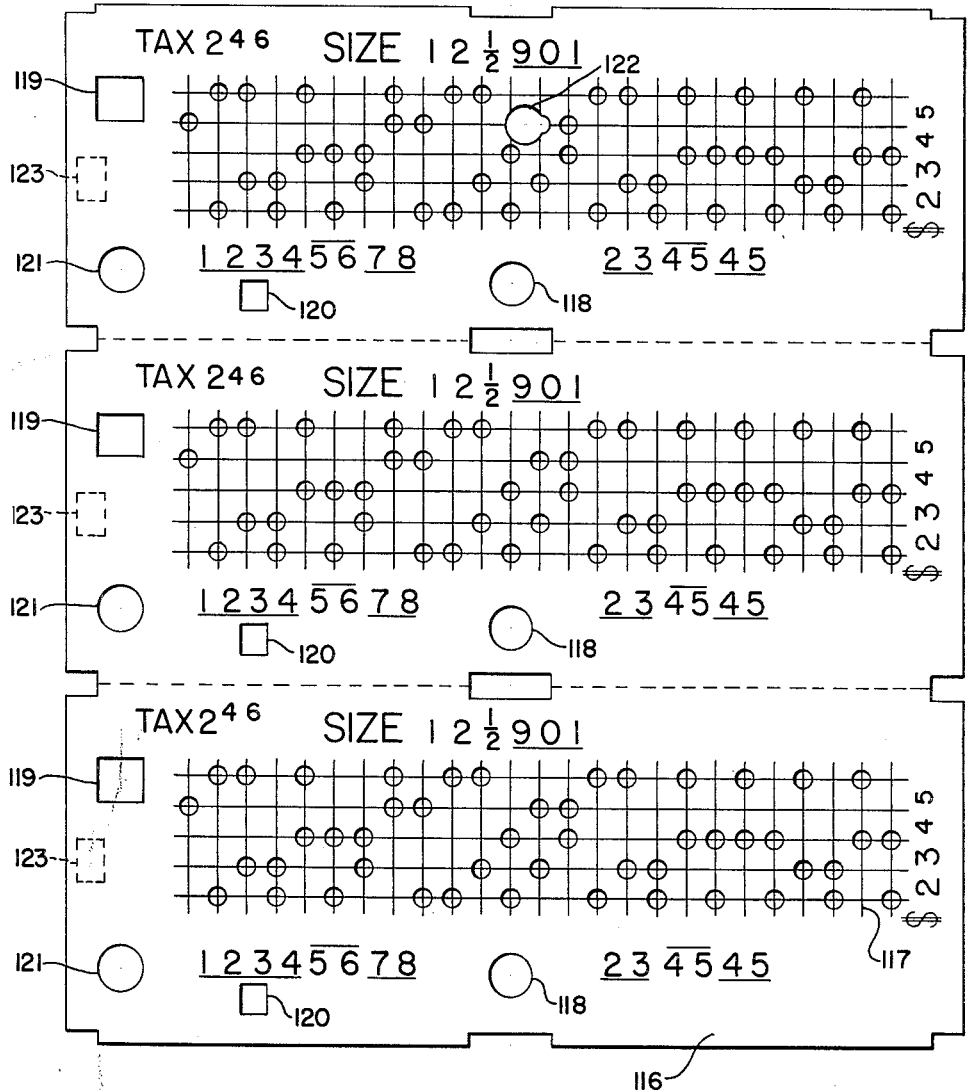
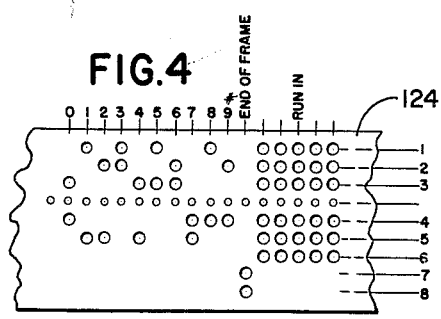
INVENTOR
JACK H. REYNOLDS
BY
Louis A. Kline
HIS ATTORNEY

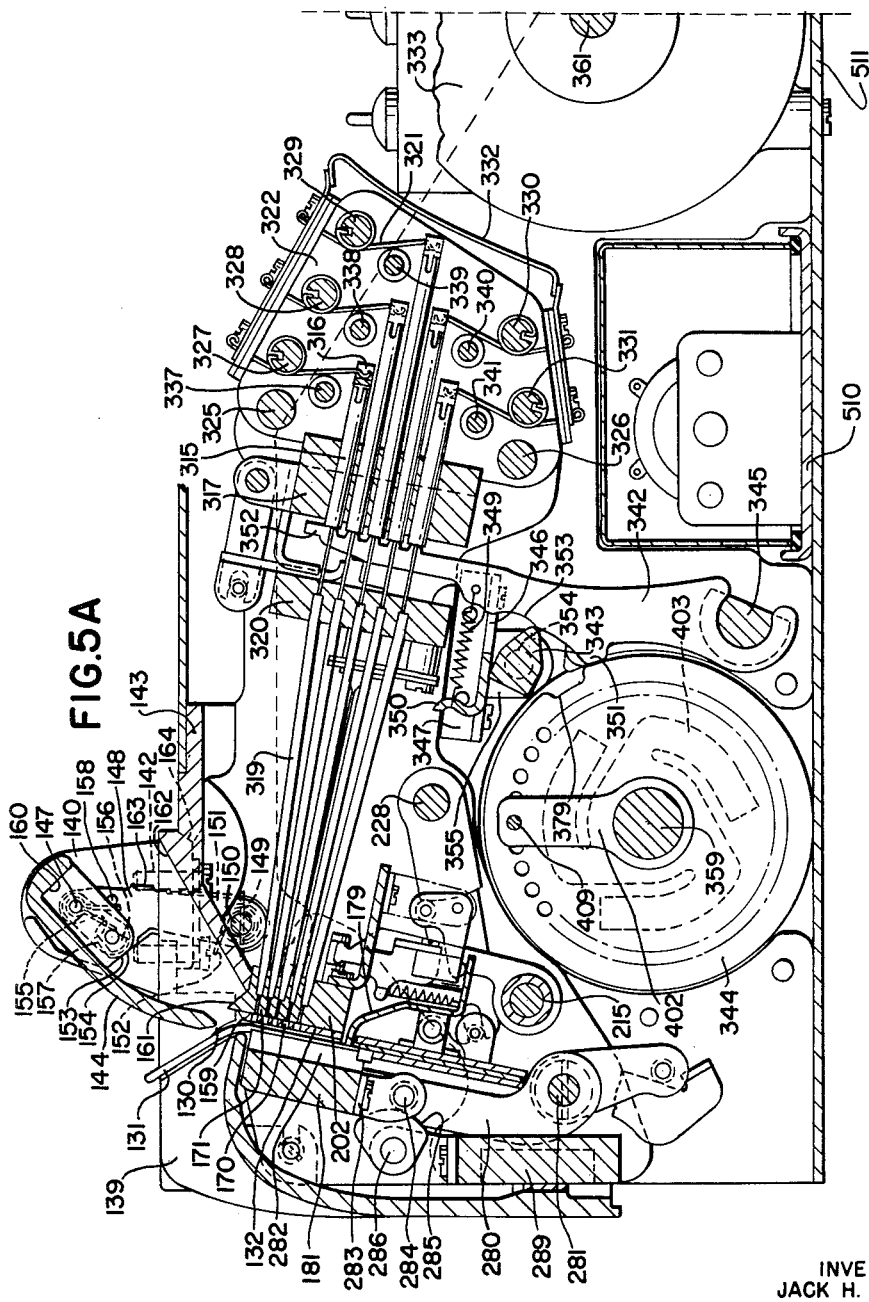

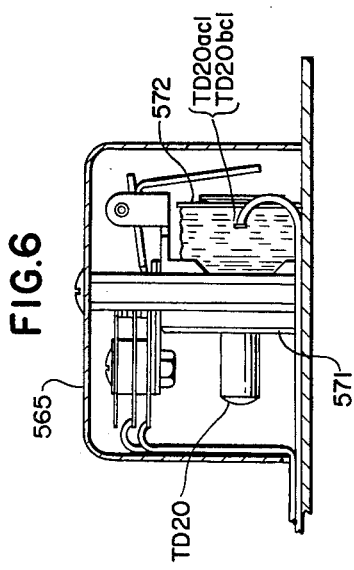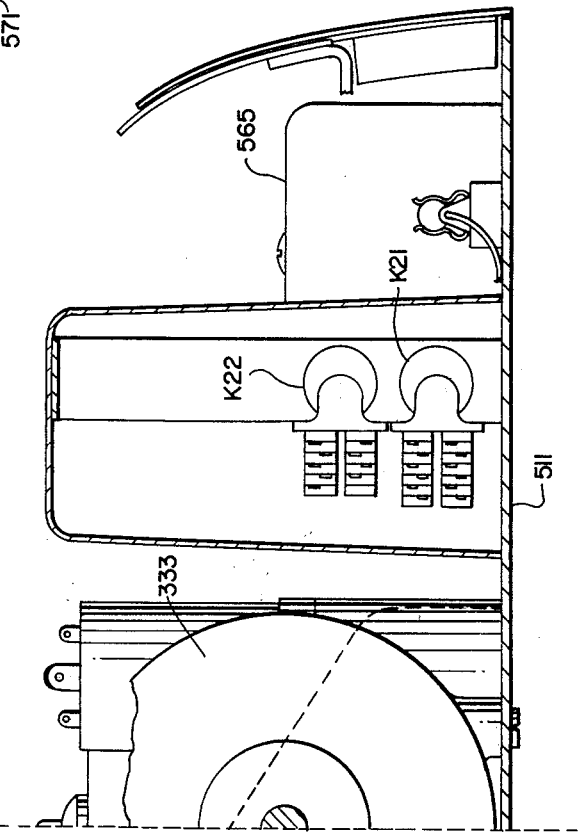

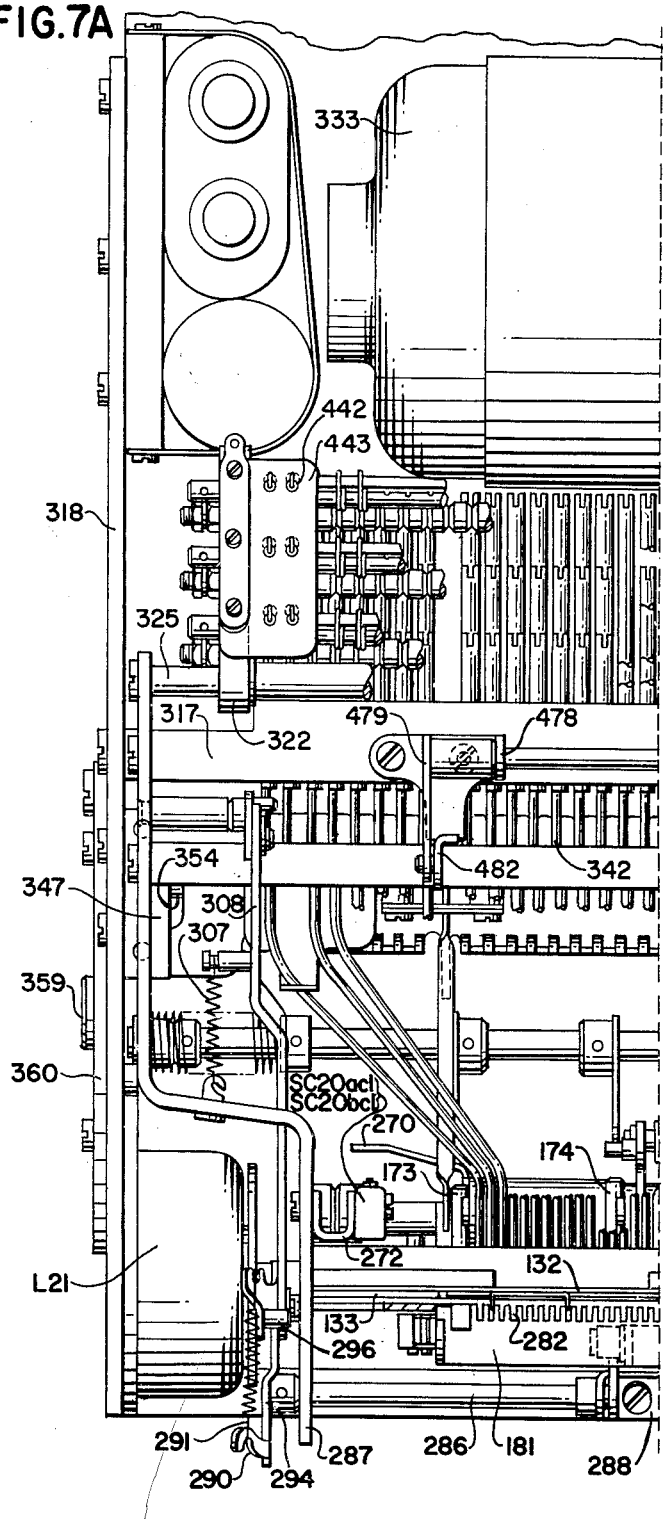

May 23, 1961 J. H. REYNOLDS 2,985,362
CHECKING DEVICE FOR RECORD CONTROLLED RECORDING APPARATUS
Filed July 9, 1959 18 Sheets-Sheet 6

INVENTOR
JACK H. REYNOLDS
BY
Louis A. Kline
HIS ATTORNEY

May 23, 1961 J. H. REYNOLDS 2,985,362
CHECKING DEVICE FOR RECORD CONTROLLED RECORDING APPARATUS
Filed July 9, 1959 18 Sheets-Sheet 7
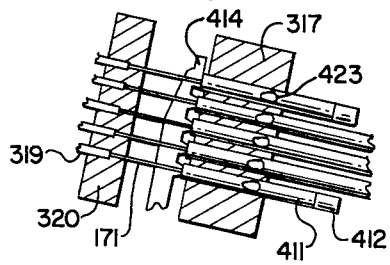
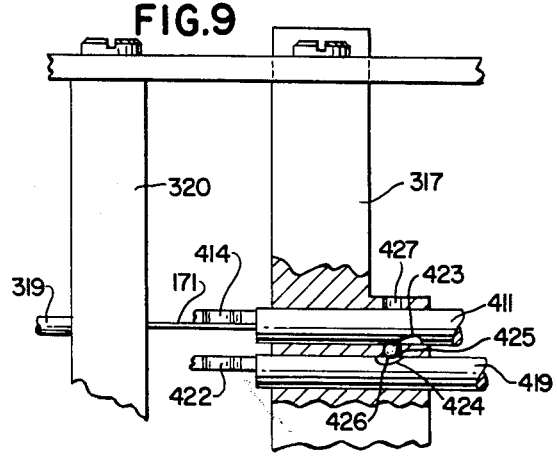
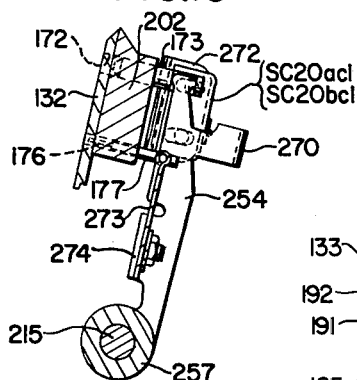
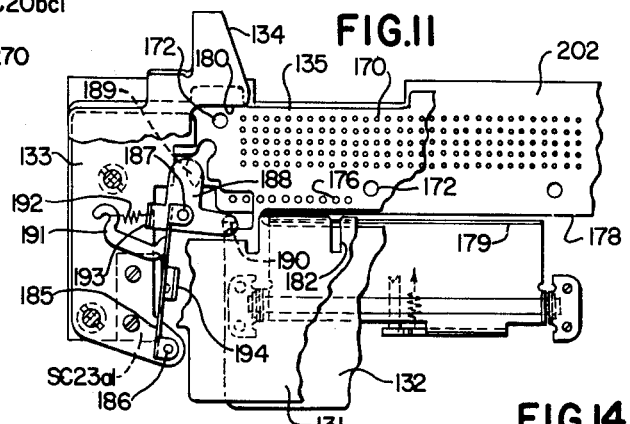
INVENTOR
JACK H. REYNOLDS
BY
*Louis A. Kline*
HIS ATTORNEY May 23, 1961 J. H. REYNOLDS 2,985,362
CHECKING DEVICE FOR RECORD CONTROLLED RECORDING APPARATUS
Filed July 9, 1959 18 Sheets-Sheet 8
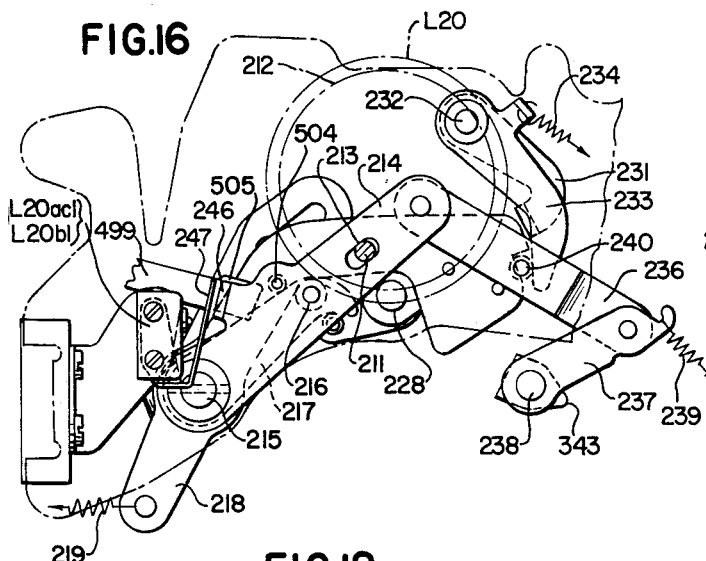
FIG.16
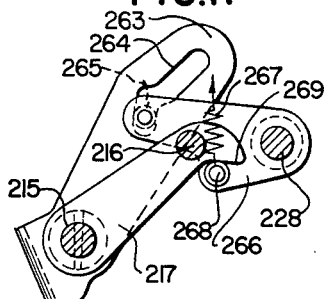
FIG.17
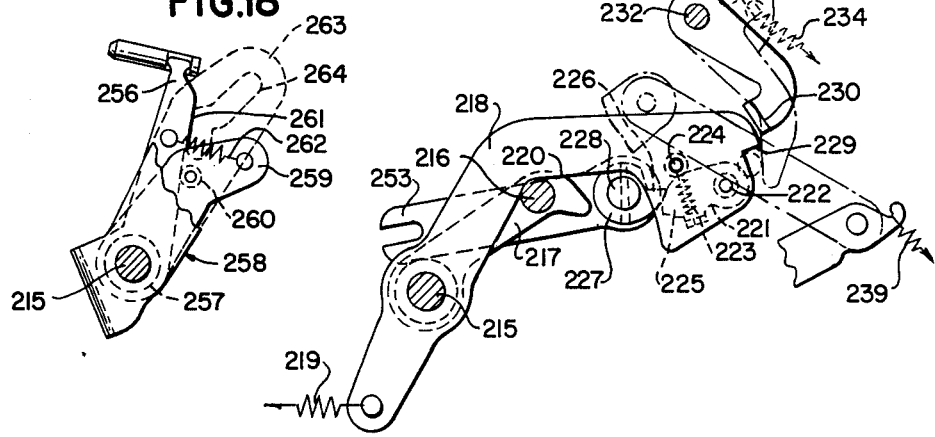
FIG.18 FIG.19
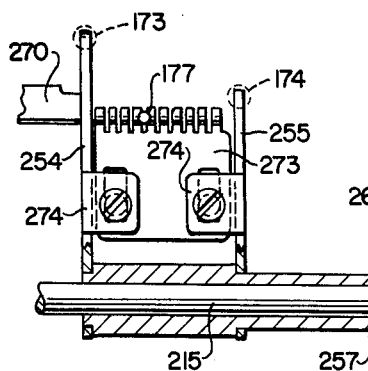
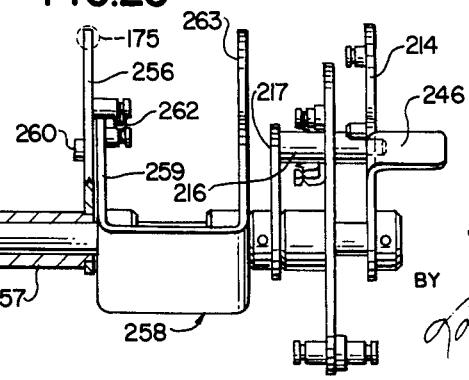
FIG.20
INVENTOR
JACK H. REYNOLDS
BY
Louis A. Kline
HIS ATTORNEY

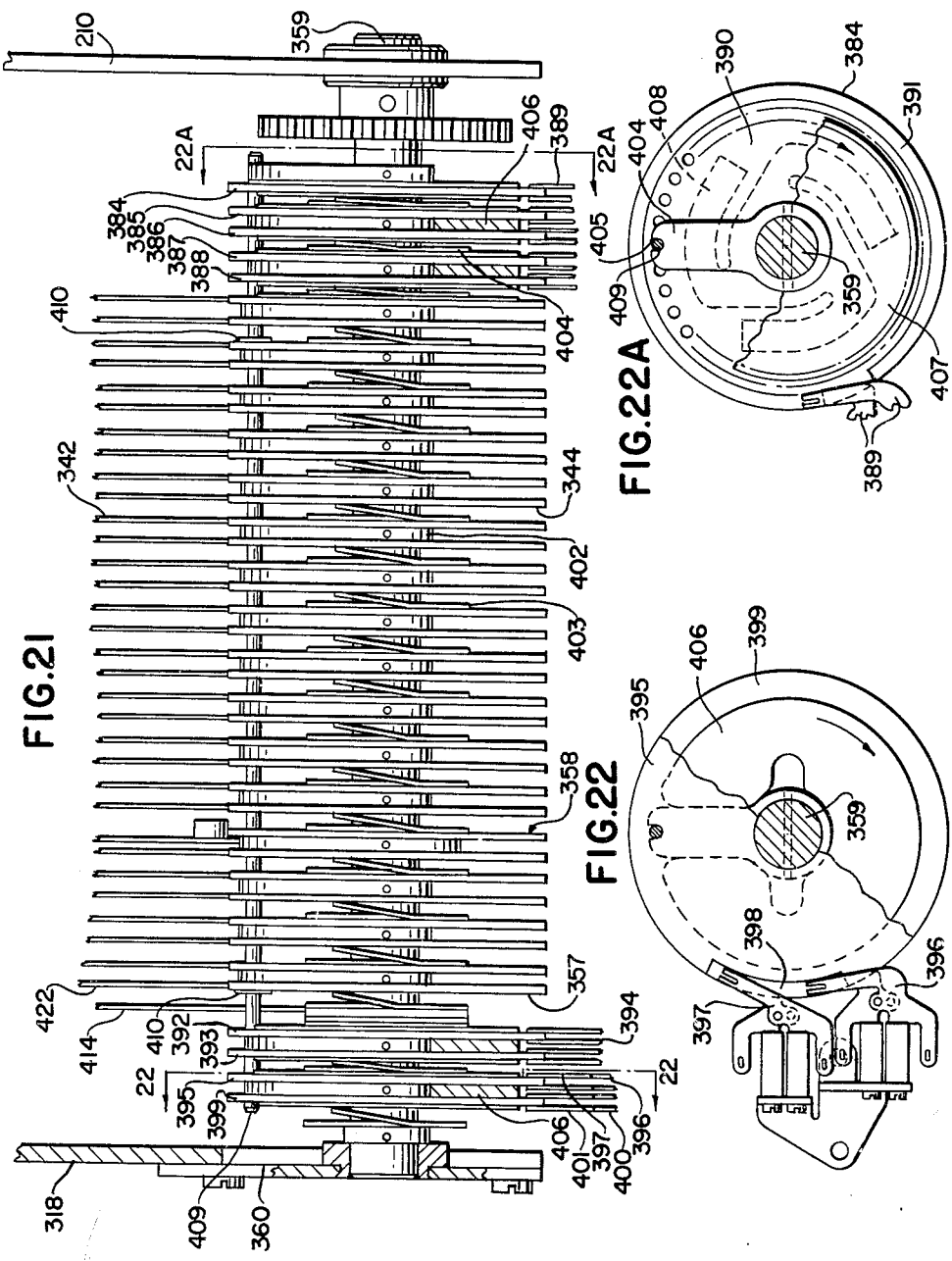

May 23, 1961 J. H. REYNOLDS 2,985,362
CHECKING DEVICE FOR RECORD CONTROLLED RECORDING APPARATUS
Filed July 9, 1959 18 Sheets-Sheet 10
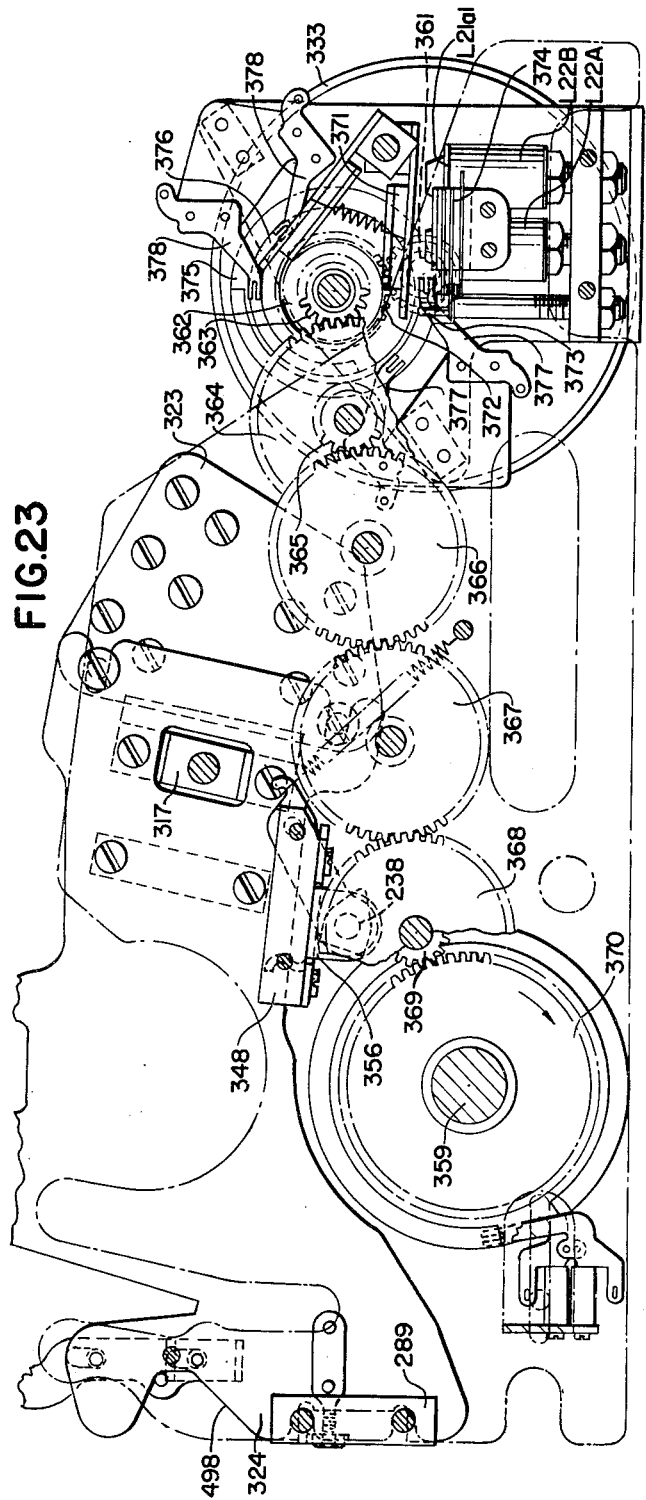
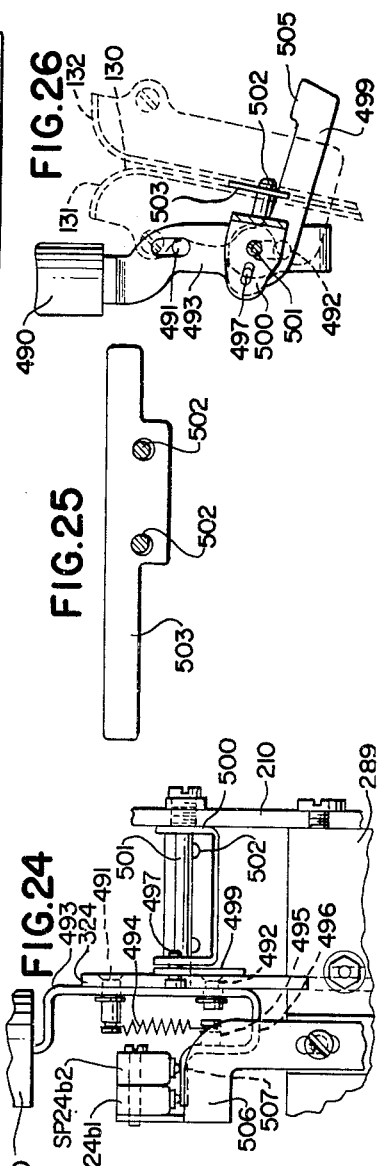
INVENTOR
JACK H. REYNOLDS
BY
Louis A. Kline
HIS ATTORNEY May 23, 1961  J. H. REYNOLDS  2,985,362
CHECKING DEVICE FOR RECORD CONTROLLED RECORDING APPARATUS
Filed July 9, 1959  18 Sheets-Sheet 11
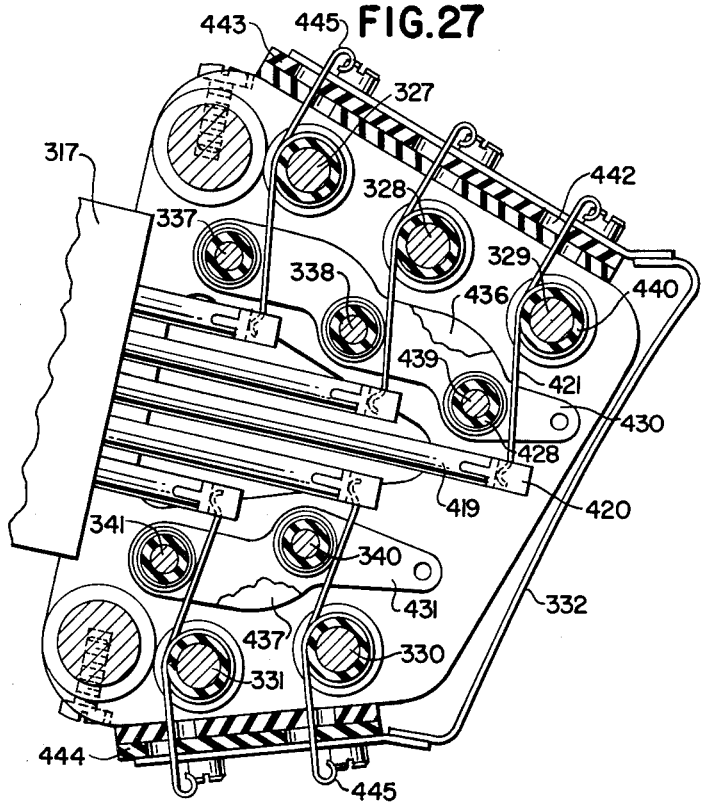
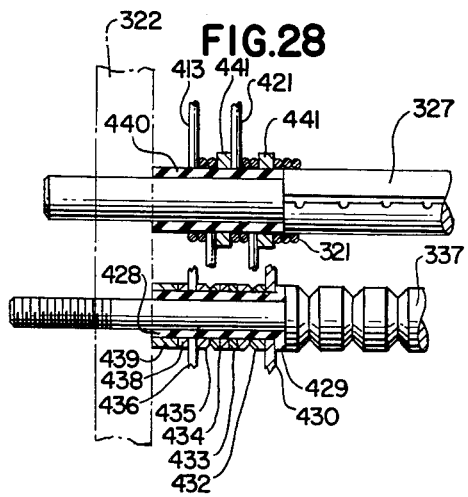
INVENTORS
JACK H. REYNOLDS
BY
Louis A. Kline
HIS ATTORNEY May 23, 1961  J. H. REYNOLDS  2,985,362
CHECKING DEVICE FOR RECORD CONTROLLED RECORDING APPARATUS
Filed July 9, 1959  18 Sheets-Sheet 12
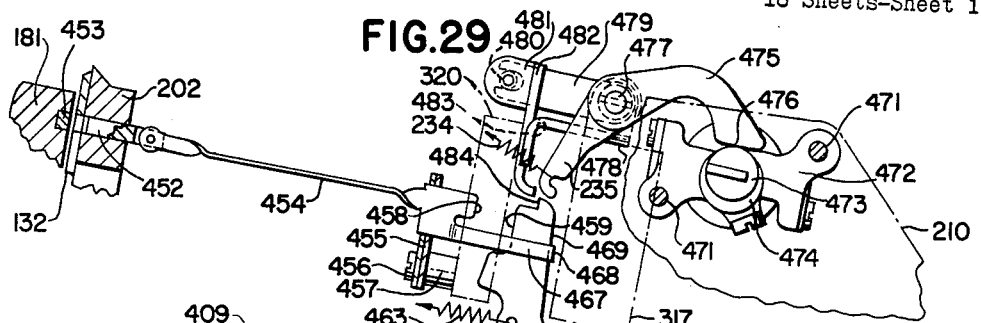
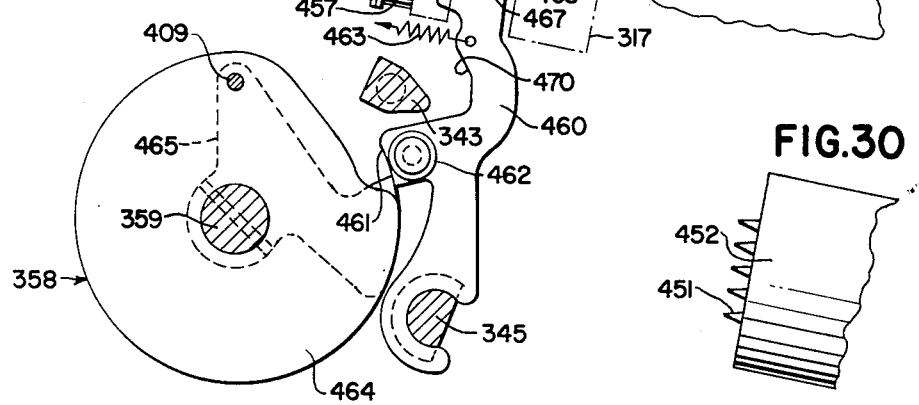
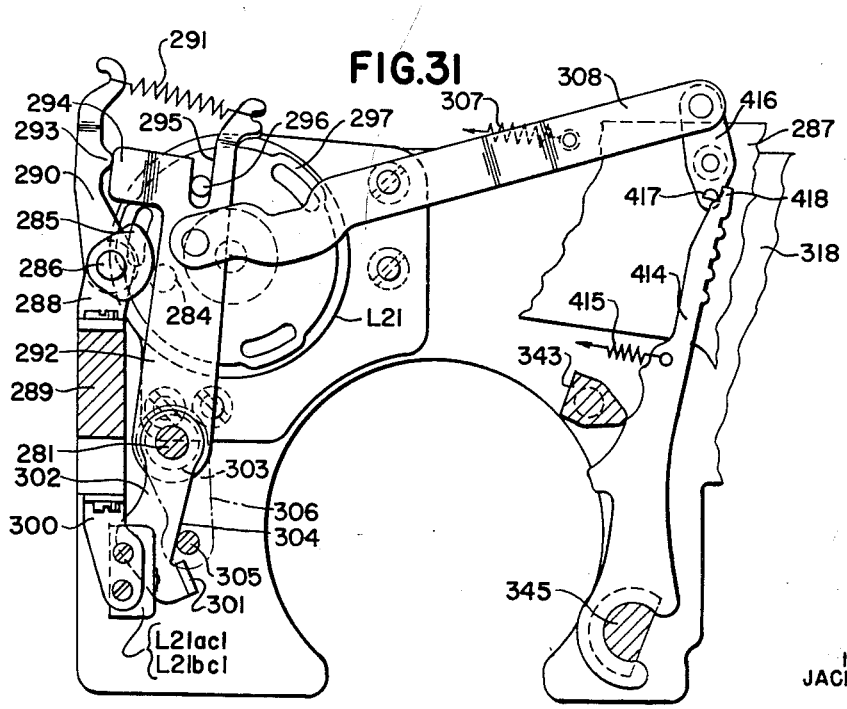
INVENTOR
JACK H. REYNOLDS
BY
Louis A. Kline
HIS ATTORNEY

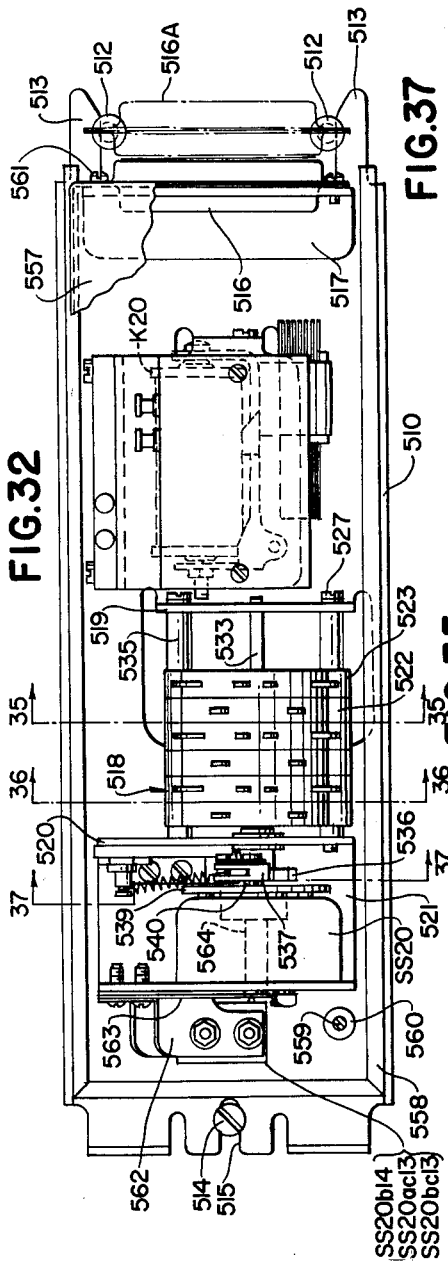
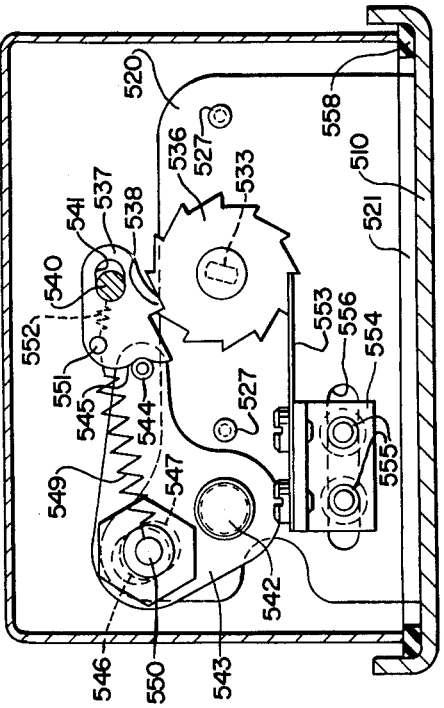
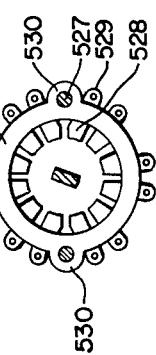

May 23, 1961 J. H. REYNOLDS 2,985,362
CHECKING DEVICE FOR RECORD CONTROLLED RECORDING APPARATUS
Filed July 9, 1959 18 Sheets-Sheet 14
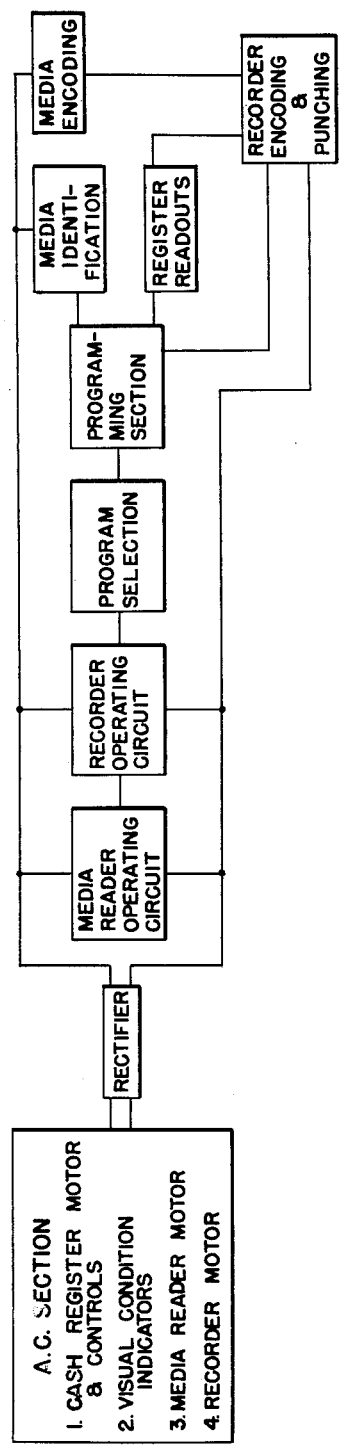
INVENTOR
JACK H. REYNOLDS
BY
HIS ATTORNEY

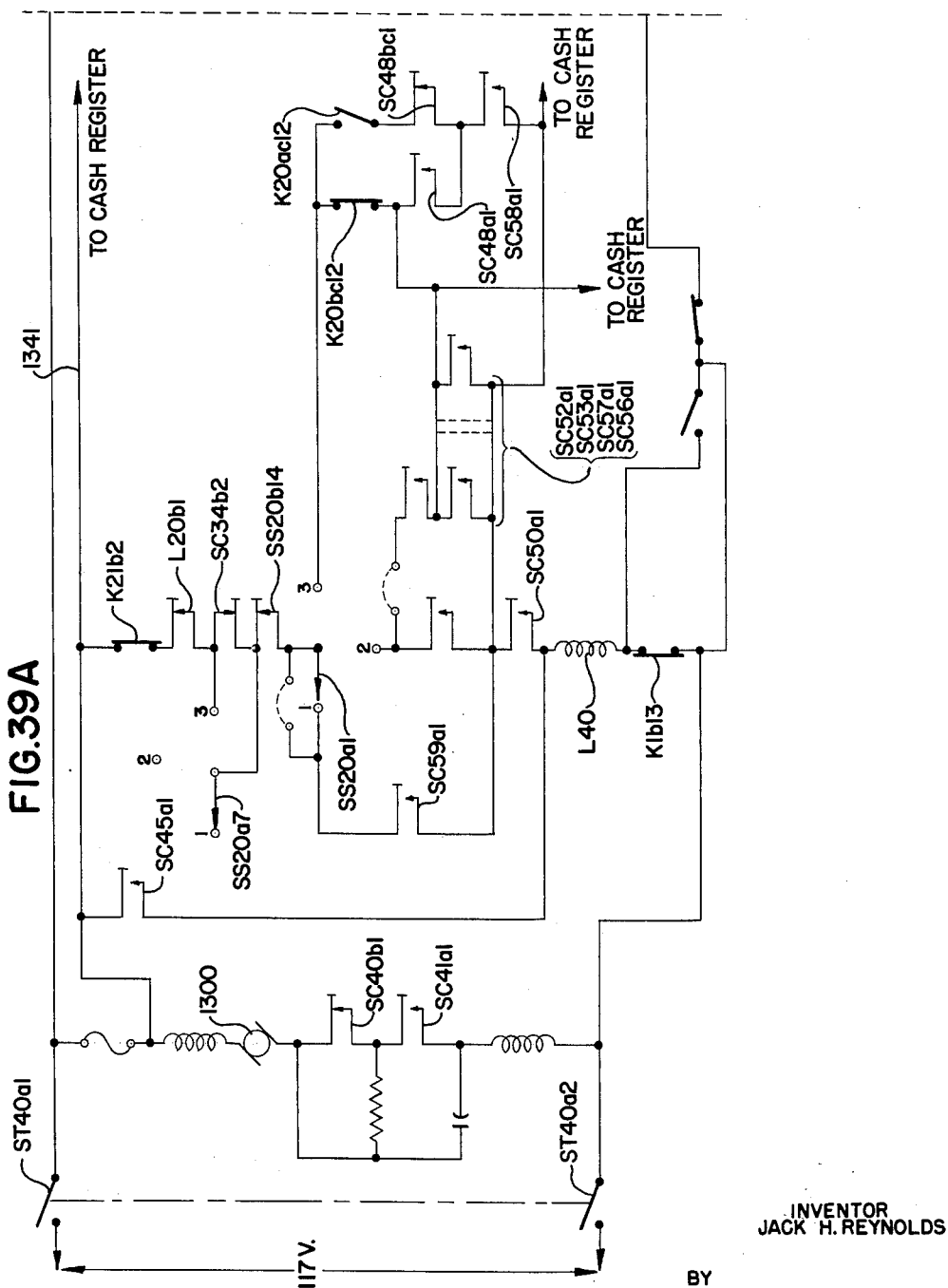

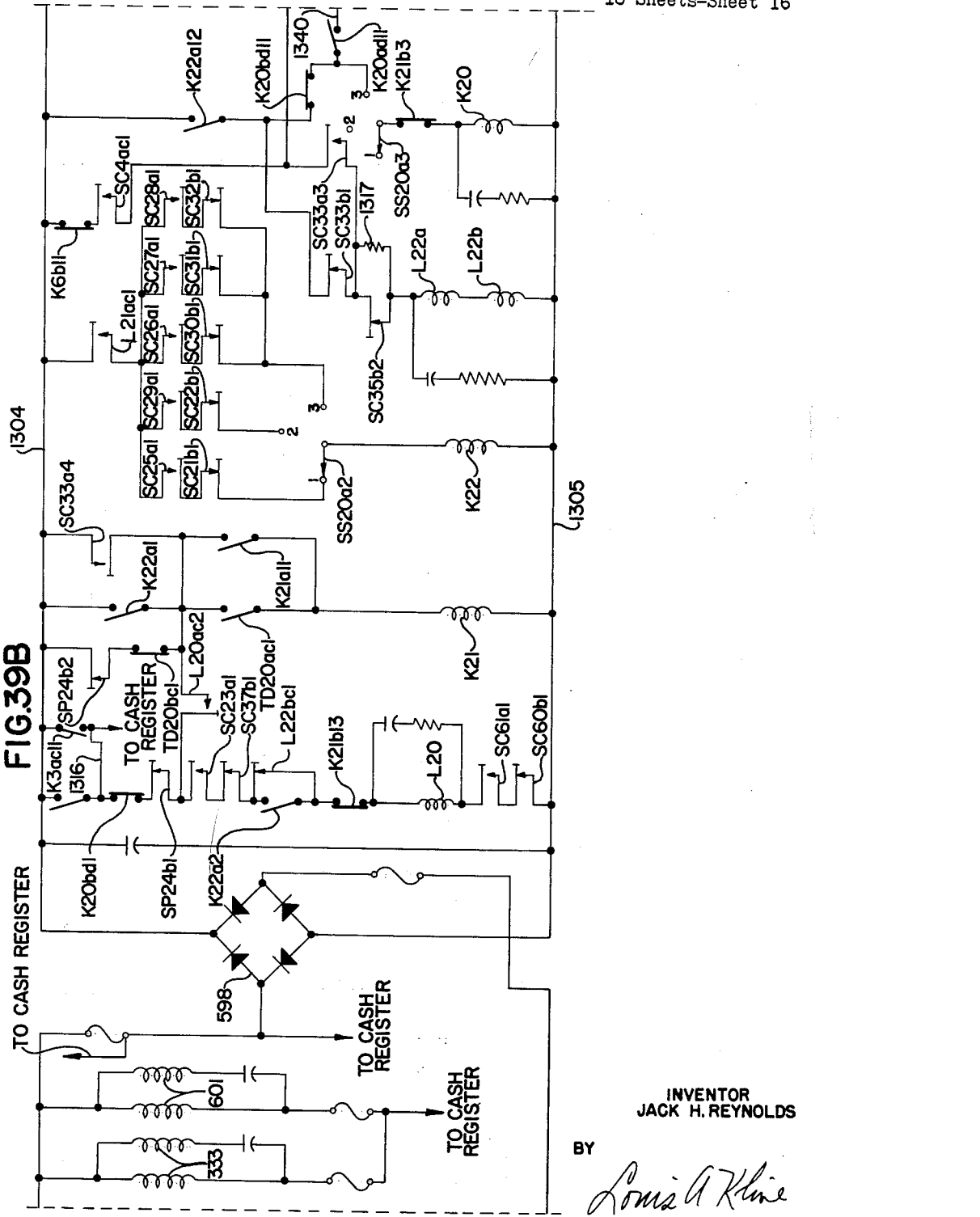

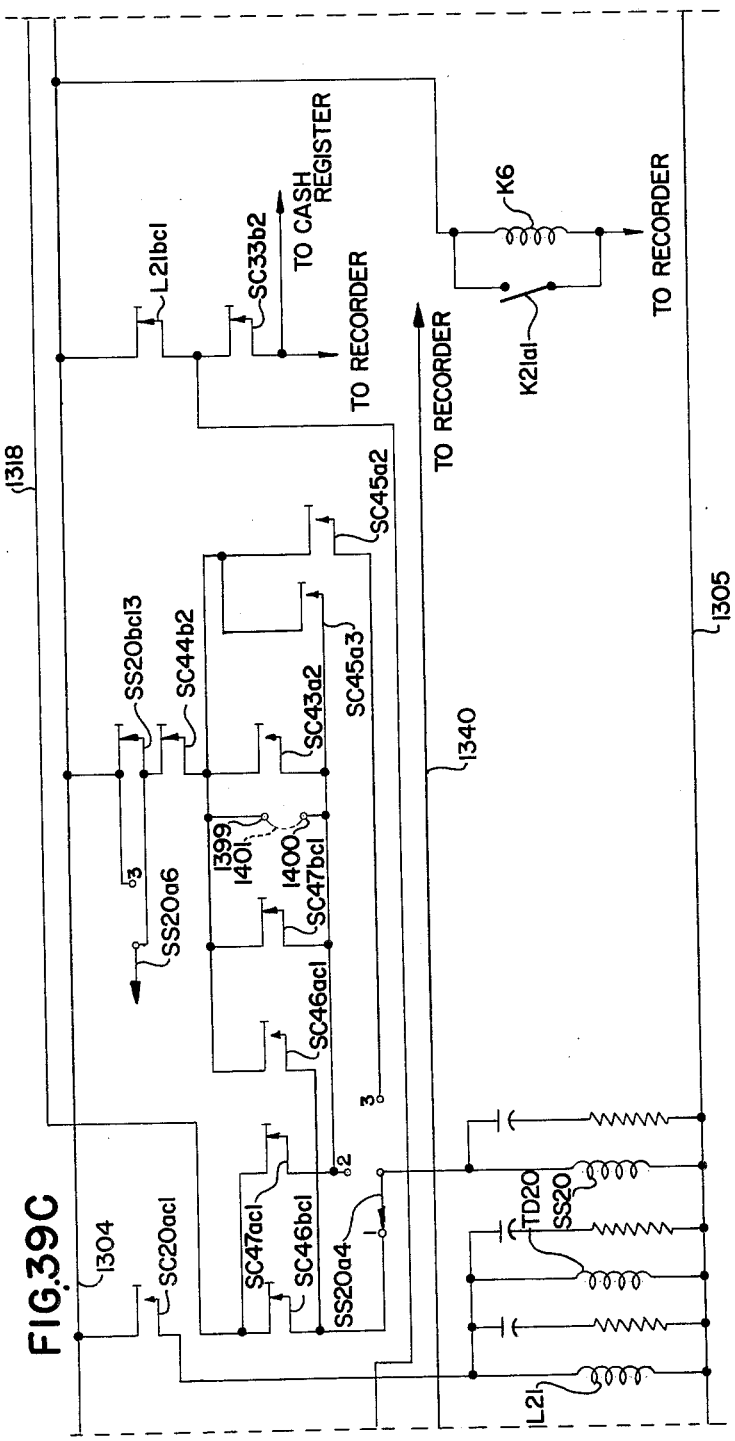

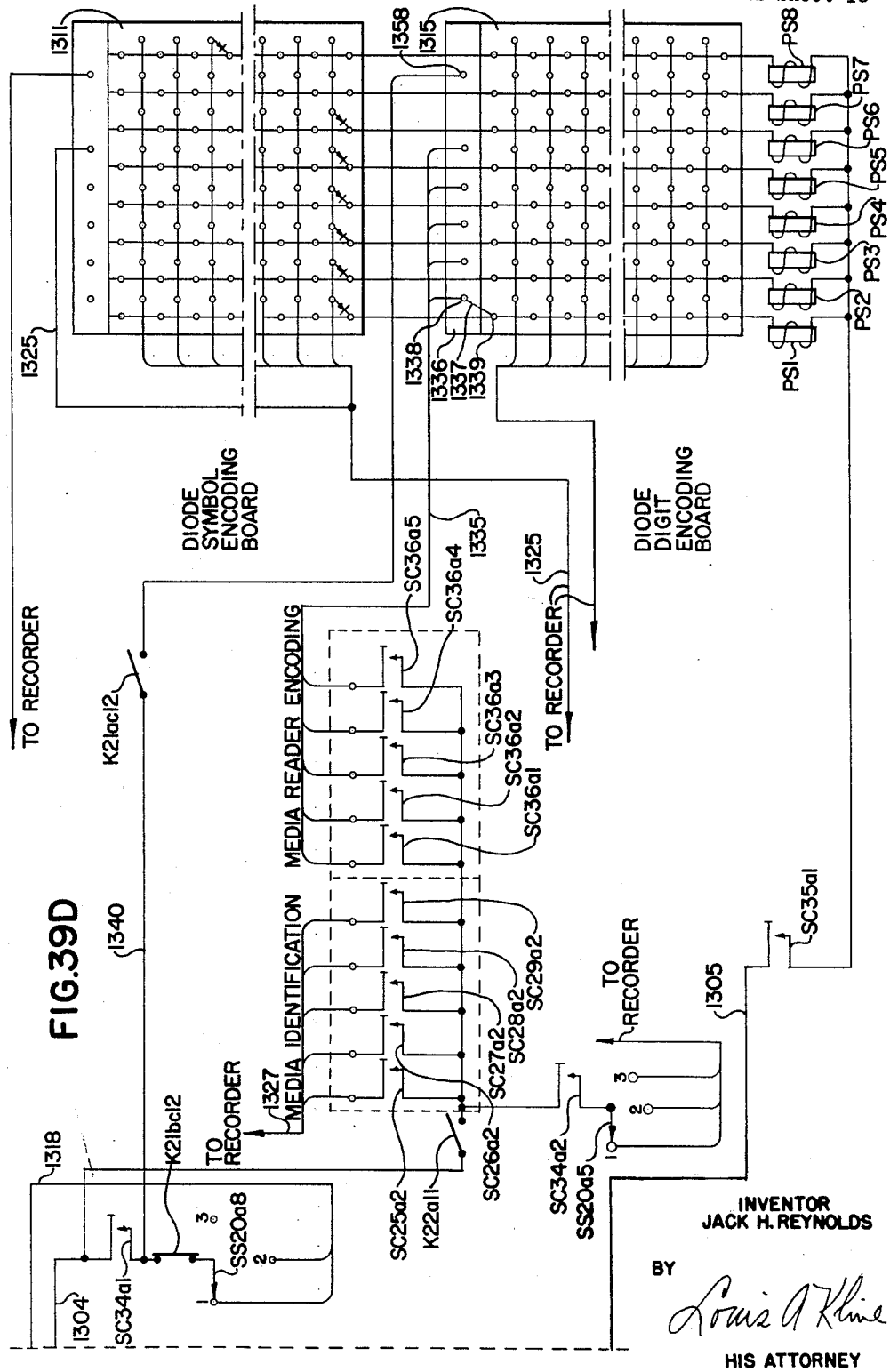

United States Patent Office 2,985,362
Patented May 23, 1961

2,985,362

CHECKING DEVICE FOR RECORD CONTROLLED RECORDING APPARATUS

Jack H. Reynolds, Dayton, Ohio, assignor to The National Cash Register Company, Dayton, Ohio, a corporation of Maryland Filed July 9, 1959, Ser. No. 825,991

7 Claims. (Cl. 234—22)

This invention relates to improvements in a recording system of the type disclosed in the co-pending United States patent application of Richard L. Ditmer et al., Serial No. 622,591, filed November 16, 1956. More particularly, the invention relates to new and improved means for sensing and correcting errors that occur in a data-recording system.

The recording system of the above-cited application is utilized as part of a merchandising transaction. Included in this transaction is the recording, on paper tape, of information concerning the clerk involved in the transaction; the customer; the merchandise; and any monetary amounts connected with the sale. The tape is then used as a data input to a tape-to-card converter or to an electronic computer for classification and analysis.

The apparatus involved in this recording system includes a media reader, a cash register, and a tape recorder. The media reader is of the type which is capable of sensing, and transmitting to the tape recorder, information which is pre-punched into various media such as tags or tokens. This information is then punched into a paper tape by the tape recorder. The monetary amounts involved in the transaction (selling price, tax, discount, etc.) are entered into the recording system by the cash register keyboard. Thus a normal operation would include the use of the media reader and the cash register as data input devices.

The tags used in conjunction with the media reader contain rows of perforations representing the information desired. There is a tag for the clerk, the customer, and each item of merchandise. Each tag contains additional perforations identifying the tag as a clerk, customer, or merchandise tag. These perforations are used in conjunction with a sequence control means contained within the media reader. Under this type of control means, the different classes of data (clerk, customer, etc.) are recorded in a predetermined sequence. Interlocks are contained in the system to prevent the operation of the cash register while the media reader is being used. The interlocks are used in conjunction with the sequence control means. Under this system, the operator is forced to insert the different types of tags (clerk, customer, or merchandise) and to use the cash register keyboard in a predetermined desired sequence. Failure to comply with such a sequence results in the locking up of the recording system until the proper data is inserted.

In order to insure that the punched tape includes all the data required for the transaction, a parity check is contained in the system, which locks up the system upon the occurrence of an incorrect punching operation due to a failure of the sensing means of the media reader to operate or to a defective tag or for any other reason. When this condition occurs, the operator is forced to eject the media manually and then repeat the entire sequence of recording.

The parity check acts only upon the operation of the punching mechanism. Failure of the punching mechanism to operate would prevent the operation of the parity check. Thus, upon the occurrence of an operational failure of the punching mechanism, there would be no indication to the operator that such a failure had occurred. Therefore, it is an object of this invention to provide a recording system having an improved error-detecting means, which will function under all operating conditions.

It is a further object of this invention to provide an error-detecting circuit which operates independently of all human control.

It is a still further object of this invention to provide for the automatic punching of a "void" symbol in the tape, which indicates the occurrence of an error in the recording of the tape.

It is another object of this invention to provide for the correcting of the error occurring in the punching of the tape.

It is a still further object of this invention to automatically condition the media reader for a further re-reading of the media upon the occurrence of an error in the recording of the data contained in said media.

It is another object of this invention to disable the operation of the data-recording system upon the occurrence of an error in the punching operation, which forces the operator to recognize that such an error has occurred.

With these and incidental objects in view, the invention includes certain novel features of construction and combinations of parts, a preferred form or embodiment of which will hereinafter be described with reference to the drawings which accompany and form a part of this specification.

In the drawings:

Fig. 1 is a front elevational view of the novel apparatus, showing the cash register, the media reader, and the recorder components of the apparatus, together with the cables for connecting the three components of the apparatus together for joint operation.

Fig. 2 is an enlarged facsimile of a typical clerk number tag to be read by the media reader.

Fig. 3 is an enlarged facsimile of a typical multiple-part merchandise tag to be read by the media reader.

Fig. 4 represents a portion of the tape produced in the recorder and shows the code used to represent the data and the symbols.

Figure 7B:
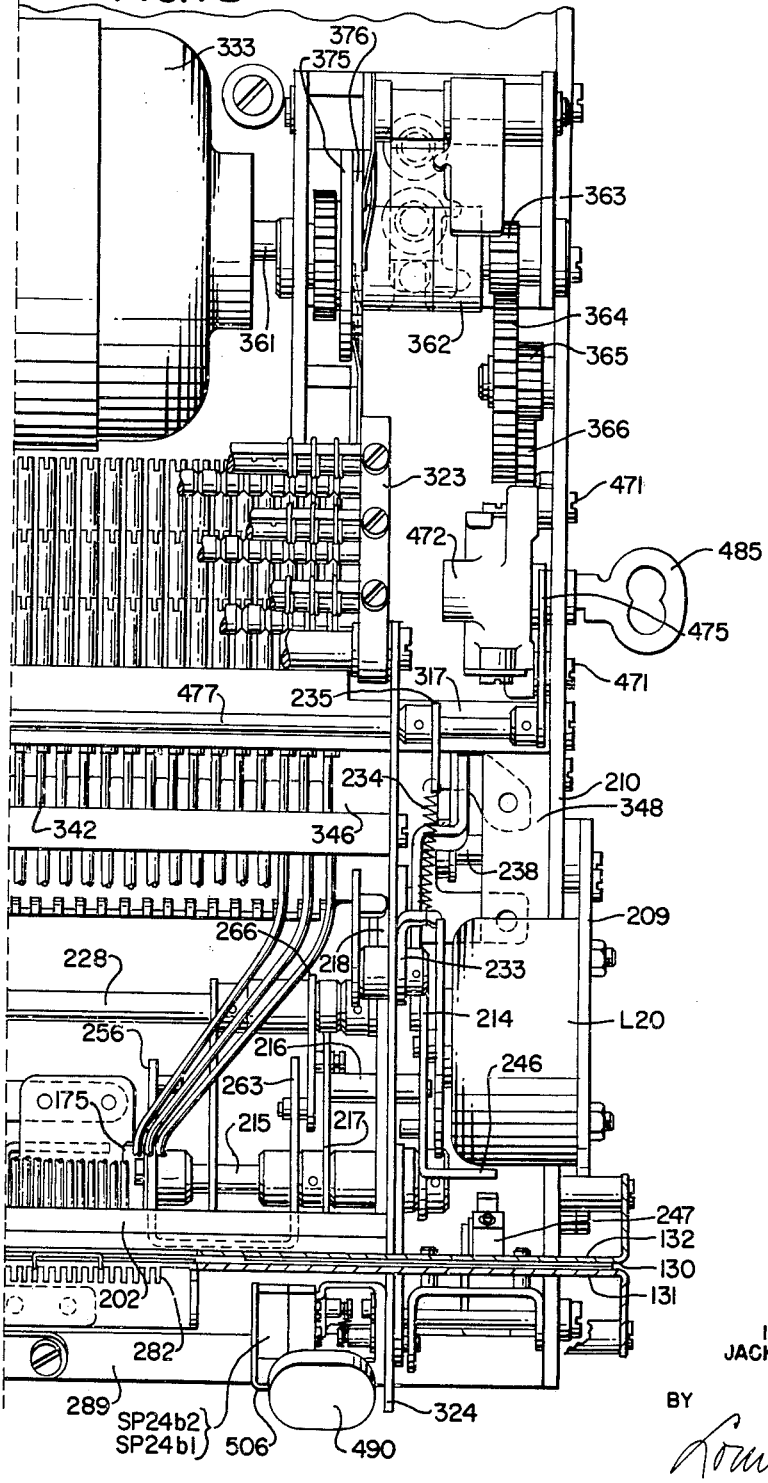

Figs. 5A and 5B together constitute a vertical section through the media reader.

Fig. 6 is a detail view of a part of the media reader.

Figs. 7A and 7B together constitute a top plan view of the media reader, with certain parts broken away to show other parts more clearly.

Fig. 8 is a side detail view of a portion of the sensing means employed in the reading of the identification column of a tag or token inserted into the media reader.

Fig. 9 is a top detail view of a portion of the identification-column-sensing means of the media reader.

Fig. 10 is a detail view of a portion of the tag-alining means and the store-identification means.

Fig. 11 is a detail view of the tag chute and associated mechanism, with portions broken away to show the various parts more clearly.

Fig. 12 is a detail view of the tag stop means.

Fig. 13 is a detail view of the tag-ejecting means.

Fig. 14 is a detail view of the starting switch mechanism.

Fig. 15 is an elevation of the tag-ejecting plate.

Figs. 16 to 20 inclusive are detail views of solenoid-operated mechanism for controlilng certain functions of the media reader.

Fig. 21 shows the media reader cam line.

Fig. 22 is a sectional view taken along the line 22—22 of Fig. 21.

Fig. 22A is a sectional view taken along the line 22A—22A of Fig. 21.

Fig. 23 is a side elevational view showing the motor, the clutch, and the gear train for driving the media reader cam line.

Fig. 24 is a detail view showing the manual tag-ejecting means.

Fig. 25 is a detail view showing the ejecting plate used in the mechanism of Fig. 24.

Fig. 26 is another detail view of the manual tag-ejecting means.

Figs. 27 and 28 are detail views of the electrical contact means for the identification-column-sensing mechanism.

Fig. 29 is a detail view of the tag-validating means.

Fig. 30 is an enlarged detail view of the validating hammer.

Fig. 31 is a detail view of the solenoid-operated mechanism for controlling the functioning of the identification-column-sensing means and the tag-clamping means.

Fig. 32 is a top plan view of the media reader selector switch units.

Figs. 33 and 34 are detail views of one of the wipers used in the selector switch.

Figs. 35 and 36 are sectional views taken on lines 35—35 and 36—36, respectively, of Fig. 32.

Fig. 37 is a sectional view taken on line 37—37 of Fig. 32, showing the switch-advancing means for the selector switch.

Fig. 38 is a schematic block diagram of a data-recording system embodying the media reader containing the present invention.

Figs. 39A, 39B, 39C, and 39D together constitute a circuit diagram of the media-reader-operating circuit shown in block form in Fig. 38.

*General description*

The invention illustrated herein is embodied in a media reader which provides means for reading data from a record member, such as a tag, perforated according to a predetermined code, and further provides means for controlling the recorder or utilizing device through electrical signals corresponding to the data read.

In the following description, the media reader will be considered to be embodied in a data-recording system in which data relating to sales of merchandise can be recorded quickly and accurately on a tape at the time the sale is made. With the data for each sale being thus recorded on a tape after the sale is made, the data for consecutive sales will appear sequentially along the tape in such manner that the tape can readily be used to control computers, or other data-processing equipment, to quickly produce stock control data, sales data, and statistical information or other reports which might be desired.

In order to have all of the information about the sale which will be needed to produce the various control data, statistics, or reports, it may be necessary to record clerk, customer account, or merchandise identification data as well as sales data for each sale. Accordingly, for each article sold, the tape will be punched with clerk number data, followed by customer or account number data, followed by merchandise identification data, followed in turn by a related set of data giving details pertaining to the nature and the amount of the sale. The punched segment of tape pertaining to each complete transaction, including clerk identification, customer identification, merchandise data, tax or other operation, and total, is considered as a "frame" of information on the tape and will normally be separated from other adjacent frames of information by "End of Frame" symbols.

Apparatus making up a system of the above type is shown in Fig. 1 and includes the recorder 100, which can produce punched tape; a media reader 101, which can control the recorder to cause clerk identification, customer or an account identification, and merchandise description data to be punched on the tape; and a cash register 102, on which sales data can be set to control the recorder to cause sales data to be punched, on which tax, total, and other operations can also be set for registering and recording, and which on occasion can also control the recorder for the punching of clerk and customer identification and merchandise description data when tags or other record members adapted to be read by the media reader are not provided. The recorder, the media reader, and the cash register are connected by cables for a joint operation, and, while they are shown as separate units in Fig. 1, all three units could, if desired, be contained in a single cabinet.

The media reader is provided to control the recorder to supply the clerk number identification, customer or account number identification, and merchandise description data. This data is read from a tag which has been previously perforated according to a predetermined code to represent the information which it is desired to read and record.

Shown in Fig. 2 is a clerk number tag 103, on which a clerk-identifying number is punched. This tag is retained in the possession of the clerk and is inserted into the media reader, as will be disclosed subsequently, whenever the clerk utilizes the recording system, in the completion of a transaction, in order to cause a number identifying the clerk to be recorded.

The tag, as shown in Fig. 2, has provision for an identification column and sixteen columns of punched data, and a longer tag, capable of providing additional columns, may be used if desired. Customarily, however, only seven columns will be used for punched data, since this will provide sufficient capacity for most applications. Also in some instances, as will be described subsequently, it may be desired or necessary to use rows 2 to 8 inclusive of the cash register keyboard to enter the clerk number into the recording system in the event that a clerk number tag is not used, and this limits the clerk number to seven digits unless two or more consecutive operations of the register are used for this purpose. As an example of the data which may be punched in the tag of Fig. 2, the first column is punched with an identification symbol in channel 1 of the first column to identify this as a clerk number tag, and the next seven columns are punched with a four-digit code identifying the clerk, 0003586. The digits punched in these columns are also printed on the tag for direct inspection.

In addition to the clerk-identifying data which is punched and printed thereon, the tag may also have printed thereon the clerk's name, "John Doe," and, if desired, additional information (not shown), such as the department of the store in which the clerk is employed, etc.

In addition to the identification columns and the columns of punched data, the clerk number tag as shown in Fig. 2 has two alining holes, 104 and 105, a further hole, 106, and a cutout portion, 107. It will be noted that the alining hole 104 is round, while he alining hole 105 is square. Both of the media reader alining pins are round in cross section, but the hole 105 is of square configuration to permit variations in tag length due to temperature and humidity conditions. The hole 106 is provided to register with a store identification pin on the alining mechanism of the media reader, which pin is used for checking the customer number tag, as will be described subsequently.

The cutout portion 107 on the clerk number tag registers with a validation stamp on the alining mechanism of the media reader, which stamp is used in connection with the merchandise tags, as will be described subsequently. Since it is not desired to use the validation stamp on the clerk number tag, the portion of the tag 103 which would otherwise be stamped is cut away.

The customer number tag is of similar construction to that shown in the clerk's tag. For a complete disclosure of the customer number tag, reference should be had to the co-pending United States Patent application Serial No. 622,591, filed November 16, 1956, by Richard L. Ditmer et al.

Shown in Fig. 3 is a three-part merchandise tag 116, on which the pertinent merchandise-identifying data pertaining to an article is customarily punched at the Receiving Department of the store when the article is received. The tag is suitably attached to the article and remains with the article until the time of the sale, at which time either it may be read and validated while retained on the article, or a portion of it may be detached and placed in the media reader for reading and recording information relating to the merchandise.

Each portion of the tag, as shown in Fig. 3, has provision for twenty-five columns 117 of punched data. In each portion, the first column is punched with an identification symbol, shown here in channel 3 but which may be in any one of channels 3, 4, or 5, depending upon the type or length of the merchandise tag. This symbol, punched in channels 3, 4, or 5 of column 1, identifies the tag as a merchandise tag and also more specifically identifies the type or length of the merchandise tag. For a detailed description of the type of data which may be punched in the remaining columns of this tag, reference may be had to the above-mentioned application of Richard L. Ditmer et al., Serial No. 622,591, filed November 16, 1956.

The data which is punched in the various columns is also printed on each part of the tag 116 and is grouped by underlining for ready separation of the component parts of the number to assist in the visual reading of the data. The amount on the tag is used merely to provide a comparison between the original price of the article and the price at which the article was actually sold, as indicated by the amount which is set up on the cash register as a part of the recording of the sales data.

In addition to the identifying data which is punched and printed thereon, the tag may also have printed thereon any other desired additional data, such as tax data, which may be of assistance to the clerk in making the sale.

The alining holes 118 and 119 and the store identification hole 120, found in each section of the merchandise tag 116, are similar to their counterparts in the clerk number and customer number tag. In addition, a third alining hole, 121, is provided in each part of the merchandise tag. This third alining hole has no function when the merchandise tag is used in the media reader of the present invention, but it may be used in the event that the merchandise tag is used in a media reader of a different type, and is therefore provided in the manufacture of the tag.

A string hole 122 is provided in the topmost portion of the three-part tag 116 for use in attaching the tag to the article with which it is associated. This portion of the three-part tag cannot be read by the media reader, since the string hole 122 is positioned in the area in which the encoded data is punched and would cause an erroneous reading and recording to take place.

It will be noted that a validating area 123 is provided in a section of each part of the multiple-part merchandise tag 116 which corresponds to the cut-away portion of the clerk number and customer number tag. During the reading of each tag, a validating mechanism in the media reader causes an impression to be made in the validating area of the tag being read, in a manner which will be described subsequently. The merchandise tag will customarily be read without detaching the portion actually being read from the remainder of the tag, and this portion, which is marked during reading with a validating mark, will be retained as an integral part of the multiple-part merchandise tag 116.

Then, in the event that the customer purchasing the article wishes for any reason to return said article, an examination of the merchandise tag 116 by the clerk when the return is being made will disclose the validating mark on the lowermost portion of the multiple-part tag and will give notice that the article has previously in fact been purchased at the store. The article, together with its attached merchandise tag 116, may then be returned for sale to its rack or counter after simply detaching the lowermost portion of the multiple-part merchandise tag to remove that part of the tag which bears the validating mark.

The cash register is provided to control the recorder to cause punching of sales data set up on the cash register. The data may include such information as the amount of the sale, a consecutive reference number, which is different for each succeeding transaction and serves to identify each transaction, etc.

The recorder 100, which is controlled by the media reader 101 and the cash register 102, is operable to produce a punched paper tape 124, of the type shown in Fig. 4. The tape 124, shown in Fig. 4, illustrates the code which will be used to represent data and symbols in the embodiment being described. It will be clear that the particular code shown in Fig. 4 is merely illustrative and that other codes may be used to represent the data.

The control of the recorder by the media reader 101 and the cash register 102 is coordinated by programming means which can be set up to provide several punching sequences which may cause the recorder to be controlled by the media reader and the cash register jointly or by the cash register alone, as required to record the necessary data on the tape. Control of the recorder by the media reader and the cash register is also coordinated by a replaceable sequence control means which determines the sequence of recording of different classes of data, such as clerk number data, customer number data, and merchandise data. The sequence control means may be replaced by another similar means to vary the sequence of recording of different classes of data as required. In the use of the system, a main power switch 125 (Fig. 1), located on the indicator cover of the cash register 102, is closed to supply operating power to the three components of the recording system. This is done at the beginning of a day's business.

In completing each transaction during the business day, the clerk will customarily first depress an appropriate key in row 9 of the cash register descriptive of the type of transaction and will then insert his clerk number tag into the media reader for reading and recording. Insertion of the tag causes initiation of a reading operation by the media reader, and recording of the information read, and also causes the tag to be gripped and held in the reader until all information on the tag has been read, after which it is released. Means which will be described subsequently are provided to prevent reading of the wrong tag through inadvertence or mistake.

After the clerk number tag has been read, the clerk will, unless the transaction is a cash sale, insert the customer number tag, which will be supplied by the customer, into the media reader for reading and recording. In the event of a cash sale, customer number information is not necessary and may be omitted. The customer number tag is read and the information recorded in the same manner as has been described for the clerk number tag.

Following the reading of a customer number tag, or following the reading of a clerk number tag in the event of a cash sale, a merchandise tag is inserted into the media reader for reading and recording. The merchandise tag may be read while it is still attached to the article to which it pertains, or it may be detached therefrom for reading and recording, if desired. The merchandise tag is read and the information is recorded in the same manner as has been described for the clerk number and the customer number tags.

During the time the data is being read and recorded from the merchandise tag, the clerk can operate the keys on the keyboard of the cash register to set up the amount of the sale and other pertinent sales information related to the data being read from the tag, but the cash register is not operated until all data has been read from the tag in the media reader and recorded by the recorder onto the tape, after which the cash register is automatically released and operated. During this operation of the cash register, the data set up on the cash register keyboard is transmitted to the recorder and punched on the tape immediately following the data which has been read from the merchandise tag by the media reader and transmitted to the recorder.

Interlocking devices are provided in the cash register, in the media reader, and in the recorder to enforce the desired operating sequences. Interlocks pertaining to the media reader during an error-detecting operation will be described subsequently in this application, while the other interlocks are described in detail in the previously-mentioned United States patent application, Serial No. 622,591, of Richard L. Ditmer et al.

Provision is made for entering clerk number, customer number, and merchandise data into the recording system by use of the cash register keyboard in the event that the tags are not included in a particular application. In the event that a customer number tag or a clerk number tag is lost or mutilated beyond use, the operator reads the data from the mutilated tag; or, if there is no tag, the information may be available from memory, from an information sheet, or from some other source. This information is entered into the recording system through the cash register keyboard and by use of an appropriate transaction key on the cash register. Depression of the appropriate key in the data-entering operation conditions the electrical circuits so that the cash register can be operated without operation of the media reader. Interlocks and interconnecting controls are provided which, upon depression of the Clerk Number key of the cash register or the Customer Number key of said register, disable the media reader. These controls also lock the transaction keys of the cash register against operation when a tag has been positioned in the media reader for reading. An interlock is also provided which disables the media reader when merchandise description data is entered through the cash register keyboard, and vice versa. For a detailed description of the construction of the recorder 100 and the cash register 102 and the manner in which these machines function in the operation of a data-recording system such as that described above, reference may be had to the previously-mentioned United States patent application, Serial No. 622,591, of Richard L. Ditmer et al.

*Media reader*

The media reader 101 is shown in Figs. 1 and 5 to 37 inclusive and is operable to read data from the tags or other data-bearing members inserted therein and to control the recorder to reproduce this data on the tape. The media reader can also control the cash register for proper coordination in operation of these two components of the recording system.

The media reader of the instant embodiment has the capacity for reading an identification column and thirty data columns on a tag or other data-bearing member, each column of which may have perforations in any of five positions. It will be obvious from the following description that the capacity of the media reader, as to the number of columns, and as to the number of positions per column which may be read, is merely exemplary and that the capacity can be varied without departing from the invention.

*Tag chute and guide means*

As best shown in Figs. 5A, 5B, 7A, 7B, 11, and 13, the media reader is provided with a chute 130 for receiving tags or other record members to be read. This chute is formed by a front plate 131 and a rear plate 132, spaced apart by a spacing plate 133 (Fig. 11), and extends from a vertical slot in the right side of the machine, as viewed in Fig. 7B, leftward to an auxiliary frame member 287. The extension of the chute to the right as viewed in Figs. 7A and 7B through the vertical slot in the right side of the machine enables record members of any desired size to be read by the media reader, so long as the encoded perforations thereon are properly placed in one corner of said record member. The upper edges of the front and rear plates 131 and 132 are cut away at 134 and 135 (Fig. 11) in the central portion to enable the tags to be pushed down far enough in the chute to insure that they will be in position to be sensed. The upper end of the front plate 131 is flared outwardly to form a throat, which facilitates the placing of tags in the chute and guides the tags into proper position relative to the sensing means.

Provided on the housing of the media reader for cooperation with the tag chute 130 are means for guiding the insertion of tags or other record members into the media reader, and for temporarily holding such tags, etc., after they have been read and ejected from the media reader.

The upper front surface of the media reader housing is shaped to provide an entrance 139 (Figs. 1 and 5A) to the tag chute 130. The width of the entrance 139 is less than that of the tags which will normally be read by the media reader, but is sufficient to accommodate part of the hand of a person putting a tag into the reader, and thus facilitates placement of a tag in the tag chute 130. The cut-away portion 134 of the front plate 131 of the chute 130 conforms to the shape of entrance 139.

Two end members, 140 and 141 (Figs. 1 and 5A), are mounted by bolts 142 to a frame member 143, which forms a part of the top surface of the media reader. Extending between said end members is a transparent guide plate 144, having semi-circular cut-out portions 145 and 146 to facilitate the grasping of tags. Said guide plate is pivotally mounted at either end by a stud 147 on an arm 148, both of which arms 148 in turn are fixed by a pin 149 to a shaft 150 rotatably mounted near its ends in brackets 151 secured to the frame member 143. The arms 148 and the shaft 150 are normally urged counter-clockwise, as viewed in Fig. 5A, by a spring 152, secured at one end to the pin 149 and bearing at its other end against one of the brackets 151. Counter-clockwise movement of the arms 148 and the shaft 150 is limited by contact of a surface 153 on one of the arms 148 with a stop surface 154 on the end member 140.

A spring 155 urges the guide plate 144 clockwise with respect to the arms 148, so that a sector-shaped stud 156 on said plate is normally positioned against a bent-over ear 157 on the arm 148. The spring 155 bears at one end on the stud 156, curves around the pivot stud 147, and bears at its other end against a stud 158 on the arm 148.

When it is desired to insert a tag or other record member into the media reader to be read, the tag is grasped by the operator and inserted into the tag chute 130. The entrance 139 provides space for the operator's hand, as does the guide plate 144, which shifts to the rear to provide access to the tag chute 130. The guide plate 144 first rocks counter-clockwise (Fig. 5A) with respect to the arms 148 under the influence of inward movement of the operator's hand until the two end portions of the spring 155 contact each other, after which the arms 148, carrying the plate 144, pivot clockwise about the axis of the shaft 150 against the force of the spring 152. Clockwise movement of the arm 148 is limited by contact of a surface 163 on each of the arms with a cooperating surface 164 on the frame member 143. The outwardly-curved upper part of the front plate 131 adjacent each side of the entrance 139 guides the tag into the chute 130, as does a beveled top edge 159 of the rear plate 132.

Once a single-part tag has been properly positioned for reading, as will be described subsequently, the operator's hand is withdrawn, and the guide plate 144 is returned by the springs 152 and 155 to the position in which it is shown in Fig. 5A.

Upon completion of the reading of the single-part tag, means to be described subsequently eject the tag upwardly out of the tag chute 130. Since the guide plate has been returned to the position shown in Fig. 5A, the ejected tag will fly upward to the right, as viewed in Fig. 5A, of the plate 144 and will strike a stop surface 160 integral with the plate 144. The cross bar 202 and the frame member 143 are, respectively, formed with a pair of cooperating surfaces 161 and 162 to the rear of the tag chute 130. After striking the stop surface 160, an ejected tag will fall into the cavity defined by the surfaces 161 and 162 for storage. A plurality of tags may be stored in this cavity until it is convenient for the operator to remove them.

When a multiple-part tag, or some other record member which is larger in size than a single-part tag, is inserted into the media reader for reading, the guide plate 144 will be blocked, by contact with the upper portion of said tag or record member, from returning to the position in which it is shown in Fig. 5A. Therefore, when the reading operation has been completed, the tag or other member will be ejected directly outward to the left of the guide plate 144, rather than passing to the right of the said guide plate for movement into the storage cavity defined by the surfaces 161 and 162. It will be seen that any tag or record member which is being read may be ejected directly outwardly of the machine into the left of the guide plate 144 if desired, rather than into the storage cavity, if the operator manually retains the guide plate 144 in a position to the right of that shown in Fig. 5A.

The rear plate 132 of the chute is provided with thirty-one columns of holes 170 (Figs. 5A and 11), which columns are spaced across the plate just below its upper edge. Each of said columns contains five holes, equally spaced vertically of the plate, which holes allow the ends of sensing pins 171 to move into engagement with the tag when in reading position. The upper portion of the rear plate 132 is also provided with theree larger holes 172, through which pass alining pins 173, 174, and 175 (Figs. 7A and 7B), which serve to aline the tag properly in reading position. The pins 173, 174, and 175 also pass through alining holes in the tag to lock it against removal from reading position until the operation of the media reader has been completed. The upper portion of the rear plate 132 is also provided with a plurality of holes 176 (Fig. 11), through a preselected one of which passes a store identification pin 177, which serves to check all customer number tags, as has been previously described, to insure that such tags have been either issued or approved by the store using the recording system. The rear plate 132 is also provided with a slot 178 for passage therethrough of the stop surface 179 of a tag stop means which will be described subsequently.

The front plate 131 is cut out to provide an opening 180 (Fig. 11), through which may pass a clamping block 181 (Figs. 5A and 7A) for clamping the tag to be read against the rear plate 132 to retain it in reading position and prevent any shifting during a reading operation. Along the lower edge of the cut-out portion, the front plate 131 is also provided with notches 182 to provide room for ears 183 (Figs. 13 and 15) of a tag-ejecting plate 184.

Positioned between the front and rear plates 131 and 132 and serving to space these two plates the desired distance apart to permit positioning of a tag to be read therebetween is the spacing plate 133 (Figs. 7A and 11). Mounted on the spacing plate 133 is a starting switch mechanism which is adapted to be actuated by the tag to initiate operation of the media reader when the tag is properly inserted into the chute. An arm 185 (Figs. 11 and 14) is mounted on the spacing plate 133 by means of a stud 186, the arm having pivotally mounted at its upper end an L-shaped member 188, having thereon two built-up portions 189 and 190, said L-shaped member being pivotally mounted on the arm 185 by means of a stud 187. An integral portion 191 of the arm 185 is bent backwardly to provide anchoring means for a spring 192, which is secured at its other end to a bent-over ear 193 of the L-shaped member 188 and which tends to retain the member 188 in the position in which it is shown in Fig. 11. Secured to the arm 185, approximately midway thereof, is an extension 194, which is adapted to coact with the actuating means of a snap-action switch comprising contacts SC23a1 and mounted on the bar 202.

When a tag is inserted downwardly into the tag chute 130 and then is shifted to the left as viewed in Fig. 11, the lower portion of the tag will contact the built-up surface 190, and the left edge of the tag will contact the built-up surface 189. This will cause the member 188 and the arm 185, on which it is mounted, to move to the left, or counter-clockwise, as viewed in Fig. 11, about the pivot 186. The extension 194 on the arm 185 will, in such a movement, contact the actuating means for the contacts SC23a1 and thereby cause said contacts to close. This completes a circuit to initiate operation of the media reader, as will be fully described in the description of the circuit diagram.

It will be seen from an examination of Fig. 11 that, in order for the arm 185 to be rocked counter-clockwise to actuate the snap-action switch to close the contacts SC23a1, it is necessary that the inserted tag contact both of the built-up surfaces 189 and 190 on the member 188. If the tag is merely inserted downwardly to the full extent of its movement without also being shifted to the left, as viewed in Fig. 11, it will contact only the built-up surface 190 on the member 188 and will not contact the surface 189 on said member. This will result in the member 188 rocking clockwise about its pivot 187 without causing the necessary rocking movement to be imparted to the arm 185 and its extension 194 to effect actuation of the switch. Similarly, if the inserted tag is not inserted far enough downwardly to contact the surface 190 before being shifted over the contact the surface 189 on the member 188, the member 188 will merely rock counter-clockwise about its pivot 187 without imparting a rocking movement to the arm 185 and its extension 194 for actuation of the snap-action switch. The above-described switching mechanism, therefore, insures that the tag to be read must be properly positioned in the chute of the media reader before the media reader starting switch can be actuated by said tag.

*Tag stop means*

Means are provided for limiting the downward movement of a tag which is inserted into the tag chute of the media reader for a reading operation. The tag stop means is best shown in Fig. 12 and comprises a plate 200 pivoted at 201 to the rear plate 132 of the tag chute 130. The upper portion of the plate 200 is bent to pass through the slot 178 in the rear plate 132 and forms the tag stop surface 179. Secured to the cross bar 202, extending between the side frames of the media reader, is a bracket 203 having an arm 204 extending downwardly therefrom. A spring 205 is connected between a projection on said arm and the lower portion of the stop plate 200 and urges the stop plate 200 to a position in which the stop surface 179 extends through the slot 178 in the plate 132 to limit downward movement of any tags or other members which may be inserted into the tag chute for reading. Also attached to the arm 204 of the bracket 203 is a snap-action switch comprising contacts SC37b1 and having its actuating button positioned in contact with a flat portion 207 on the lower portion of the stop plate 200. The spring 205 urges the flat surface 207 of the stop plate 200 against the actuating button of the switch to normally hold the contacts SC37b1 in said switch in a closed condition.

Means are provided to shift the stop surface 179 of the tag stop plate 200 out of its operative tag-stopping position when a reading operation has been completed and it is desired to eject the tag from the media reader. Said means include a bell crank 244, adapted to coact with the plate 200, the bell crank being shiftable by a cam surface 242 on an arm 241, which is fixed to a shaft 228 for unitary movement therewith. The operating means for rocking the shaft 228 is best shown in Figs. 7B, 16, and 19. This means includes a rotary-type solenoid L20, which is mounted on an auxiliary side frame 209, secured to the media reader side frame 210. A stud 211 on an armature 212 extends into a slot 213 in a lever 214 (Fig. 16), which is pinned to a shaft 215, mounted in the media reader framework. Also pinned to the shaft 215, and connected to the lever 214 by a stud 216 for movement with said lever, is an arm 217. A member 218 (Fig. 19), mounted free on the shaft 215 and urged clockwise, as viewed in Fig. 19, by a spring 219 secured to said member and to the reader framework, includes a surface 220, positioned to coact with the stud 216. A by-pass pawl 221 is pivoted on a stud 222, fixed in the member 218, and is urged by a spring 223 against a stop 224, also fixed in the member 218. A surface 225 on the pawl is arranged to coact with a corresponding shoulder 226 of a sleeve member 227, which is pinned to the shaft 228, mounted in the media reader framework.

The member 218 has thereon a shoulder 229, which cooperates with an ear 230 on a retaining pawl 231, pivoted on a stud 232 in the media reader framework. The pawl 231 is integral with an arm 233 and is urged clockwise about its pivot 232 by a spring 234, which is connected between the arm 233 and an arm 235 (Fig. 29) of the validation mechanism.

A link 236 is pivotally connected to the lever 214 at one end, said link being pivotally connected at its other end to an arm 237 on a trunnion 238. The arm 237 and the trunnion 238 are urged clockwise, as viewed in Fig. 16, by a spring 239, connected to said arm and to the media reader framework. A stud 240 is fixed on the link 236 about midway of its ends for engagement with a surface on the arm 233.

When a properly-inserted tag causes the arm 185 (Fig. 11) to rock counter-clockwise, thereby causing the contacts SC23a1 to close, the solenoid L20 (Fig. 16) will be energized to rotate its armature 212 clockwise, as viewed in Fig. 16, and the lever 214, its associated arm 217, and the shaft 215, to which they are secured, will be carried counter-clockwise by the stud 211 about the axis of said shaft. The stud 216 will contact the surface 220 of the member 218 and rock said member counter-clockwise, as viewed in Fig. 19, about the shaft 215. This will cause the by-pas pawl 221 on the member 218 to move to a position in which the surface 225 of said pawl is positioned above the shoulder 226 on the sleeve member 227. At the same time, the lever 214 will shift the link 236 and its stud 240 upwardly and to the left, as viewed in Figs. 16 and 19, thereby permitting the pawl 231 and its associated arm 233 to rock clockwise about the pivot 232 under the influence of the spring 234. The combined movements of the member 218 and the pawl 231 will operate to place the ear 230 of the pawl 231 in blocking relation to the shoulder 229 on said member, to retain said member against clockwise movement about the shaft 215.

Counter-clockwise movement of the lever 214, when the solenoid L20 is energized, is also effective to cause an ear 246 on said lever to coact with a blade 247 to depress an actuating member of a snap-action switch mounted in the machine framework and comprising contacts L20b1 and L20ac2. Movement of the actuating member opens contacts L20b1 and closes contacts L20ac2. The manner in which the contacts L20b1 and L20ac2 function in the operation of the recording system will be disclosed in the description of the circuit diagram.

As the link 236 moves downwardly and to the right, as viewed in Figs. 16 and 19, under the influence of the spring 239, the stud 240 on said link will contact the arm 233 and will cause said arm and its associated pawl 231 to be shifted counter-clockwise against the force of the spring. This movement causes the ear 230 of said pawl to be moved out of contact with the shoulder 229 on the member 218, thereby permitting the spring 219 to impart a rapid clockwise rotational movement to the member 218, and causing the right end of said member to snap smartly downward. The surface 225 of the pawl 221 contacts the shoulder 226 of the sleeve member 227 during this movement and imparts a sudden clockwise rocking movement to the member 227 and the shaft 228, to which said sleeve is secured.

It will be recalled that the arm 241 (Fig. 12) is also secured to the shaft 228, and the clockwise rocking movement of said shaft will be imparted to said arm. This will cause the cam surface 242 on said arm to coact with the roller 243 on the bell crank 244, to rock said bell crank counter-clockwise about its pivot 245, thereby rocking the tag stop plate 200 clockwise about its pivot 201. This movement of the plate 200 is effective to retract the tag stop surface 179 out of the tag chute 130 to its inoperative position, and also shifts the surface 207 to cause the contacts SC37b1 to open.

*Tag-ejecting means*

Means are provided for ejecting a tag from the media reader upon completion of the reading operation. This means includes the tag ejection plate 184 (Figs. 13 and 15), which is positioned between the front and rear plates of the tag chute 130, in its lower portion. Bent-over ears 183 are formed on the plate 184 to insure that an effective contact will be had between the plate 184 and the tag. The ears 183 are free to move up and down in the notches 182 (Fig. 11) in the tag chute front plate 131. Additional bent-over portions 250 are provided on the plate 184 for the mounting of two trunnions 251, each of which rides in the slot 252 of an arm 253 (Figs. 13 and 15) pinned to the shaft 228.

It will be recalled from the description of the tag stop means that, when the solenoid L20 (Fig. 16) is deenergized after the completion of the reading of a tag, the shaft 228 is given a sudden clockwise movement. Since the arms 253 are pinned to said shaft, they will partake of this movement and thereby cause the ejection plate 184 to be shifted abruptly upward. The upper edge of the plate 184, and the bent-over ears 183, will contact the lower edge of the tag which has been read and cause said tag to be ejected upwardly from the tag chute 130. Arrangement of the parts operated by the shaft 228 is such that the tag stop surface 179 of the tag stop means will be retracted out of the tag chute before the tag-ejecting plate 184 is carried upwardly past the position occupied by the tag stop surface in its operative position, so that no jamming of these two parts will take place.

*Tag-alining means and store identification means*

Means are provided to aline and retain the tag to be read in proper position to be read by the media reader. The three alining pins 173, 174, and 175 (Figs. 7A, 7B, 10, 18, and 20) are slidably mounted in corresponding holes 172, extending through the cross bar 202 and the rear plate 132 of the tag chute 130, said pins being arranged to engage corresponding holes in the tag to be read, to retain said tag in proper reading position. It may be noted that tags may be employed which are of such a length that they contain only two alining holes. In such an event, the third alining pin moves with the other two pins in its normal manner but performs no alining function.

The alining pins 173, 174, and 175 are mounted on arms 254, 255, and 256, all of said arms being secured to a sleeve 257, free on the shaft 215, for unitary movement about said shaft, to shift the alining pins into and out of operative tag-alining position.

Engaging and disengaging movement is imparted to the alining pin arms by a yoke 258 (Figs. 17, 18, and 20) free on the shaft 215. One arm 259 of said yoke is provided with a stud 260, which cooperates with a flat surface 261 on the alining pin arm 256. A spring 262 flexibly connects the arms 256 and 259 together. The other arm 263 of the yoke 258 has a cam slot 264, which receives a roller 265, said roller being mounted on an arm 266, which is free on the shaft 228 and is urged clockwise about said shaft by a spring 267, connected to said arm and to the machine framework. A stud 268 is mounted on the arm 266 and is urged by the spring 267 into cooperative relationship with a surface 269 on the arm 217, which, it will be recalled, is pinned to the lever 214 for unitary movement therewith.

As has been previously described, energization of the solenoid L20 (Fig. 16), by proper insertion of a tag into the media reader, causes the lever 214 and its associated arm 217 to be carried by the solenoid stud 211 counter-clockwise, as viewed in Fig. 16, about the axis of the shaft 215. The spring 267 (Fig. 17) will cause the stud 268 and the arm 266, on which it is mounted, to follow the arm 217, thereby rocking the arm 266 clockwise about the shaft 228. The cooperation of the roller 265 on the arm 266 with the cam slot 264 in the arm 263 of the yoke 258 will cause said yoke to be rocked counter-clockwise about the shaft 215 (Figs. 17 and 18), thereby causing the stud 260 on the arm 259 of said yoke to coact with the surface 261 of the alining pin arm 256 to shift said arm and the two other alining pin arms 254 and 255, to which it is fixed by the sleeve 257, counter-clockwise about the shaft 215. The alining pin arms 254, 255, and 256 are thus moved through the holes 172 and the corresponding holes in the tag which has been inserted into the reader, to aline the tag properly for reading.

It may be noted that, in the event the tag holes should for any reason not be in registery with the arms 254, 255, and 256, the alining pin mechanism will be prevented from completing its movement forward to final position, and the alining pins will not mutilate the tag being read by punching holes therein. It will be recalled that movement is imparted to the alining pin arms by the yoke 258 (Figs. 17 and 18) and that the yoke in turn is shifted by the arm 266, said arm being caused to rotate by the spring 267 when the surface 269 of the arm 217 is moved out of blocking relationship to the stud 268 on the arm 266. The spring 267 is designed to be of such strength that it will shift the linkage operating the alining pins when no interference is placed in the path of said pins, but is not of sufficient strength to force the alining pins through the material of a tag when openings therein are not positioned in registry with the pins. The tag-alining mechanism will, therefore, operate only when a tag having alining holes properly positioned therein is inserted in the correct manner into the media reader for reading.

An extension 270 (Figs. 7A and 10) on the alining pin arm 254 is formed to cooperate with the actuating member of a snap-action switch for controlling the contacts SC20ac1 and SC20bc1. The switch is mounted on a bracket 272, which is secured to the auxiliary frame member 287. Counter-clockwise movement of the arm 254 in response to energization of the solenoid L20 (Fig. 16) causes the extension 270 of said arm to contact the actuating member of the switch to close the contacts SC20ac1 and open the contacts SC20bc1. The function performed by these contacts in operation of the recording system will be explained subsequently in the description of the circuit diagram of Figs. 39A to 39D inclusive.

Store identification means are provided to work in conjunction with the alining pins and to prevent initiation of a reading operation on a customer tag unless it has been issued or approved by the store in which the recording system is utilized. The identification means includes the pin 177 (Figs. 10 and 20), which may be mounted in any one of a plurality of positions on a comb 273 to register with a corresponding one of a plurality of holes 176 (Figs. 10 and 11) through the cross bar 202 and the rear plate 132 of the tag chute 130. A predetermined position on the comb will normally be selected for the store identification pin 177, and all of the customer tags and other tags relating to the store's recording system will be perforated in a corresponding location to permit the pin 177 to pass through the tag. The comb 273 is secured to ears 274, extending from adjacent alining pin arms 254 and 255, for movement with said arms.

It will be seen that, in the event a tag which is not perforated in the position selected by the store for identification is inserted into the media reader, the identification pin 177 will strike the tag (though not with enough force to penetrate said tag) and will be prevented from completing its normal movement to the left, as viewed in Fig. 10. Since the alining pin arms 254, 255, and 256 are rigidly connected to the pin 177, none of these arms can complete their leftward movement. As a result, the extension 270 of the arm 254 will not contact the actuating member of the snap-action switch, and the contacts SC20ac1 and SC20bc1 will not be operated to initiate reading of the inserted tag. The improper tag, which has thus blocked the operation of the media reader, must then be manually ejected from the tag chute by means to be described subsequently. Upon completion of the reading of a tag by the media reader, the solenoid L20 (Fig. 16) is deenergized, as has been previously described, thereby permitting the spring 239 to return the lever 214 and the arm 217 to their original positions. The surface 269 (Fig. 17) of the arm 217 coacts with the stud 268 on the arm 266 during this movement, rocking the arm 266 counter-clockwise about the shaft 228 and causing the roller 265 on said arm 266, in cooperation with the cam slot 264 in the arm 263 of the yoke 258, to rock sad yoke clockwise about the shaft 215. Clockwise movement of the arm 259 (Fig. 18) of said yoke is imparted to the alining pin arm 256 by the spring 262, thereby causing the interconnected alining pin arms 254, 255, and 256, and the alining pins and store identification pin mounted thereon, to be shifted back to their retracted positions, where they remain until another tag is inserted into the media reader for reading.

*Tag-clamping means*

Means are provided to clamp a tag which has been inserted into the media reader in reading position to retain said tag against shifting out of its proper reading position. A clamping block 181 (Fig. 5A) is secured between two legs 280, which are pinned to a shaft 281, mounted in the media reader framework. The clamping block is grooved, as at 282 (Figs. 5A, 7A, and 7B), to provide clearance for the sensing wires of the sensory mechanism of the media reader, and is positioned to move through the cut-out portion 180 (Fig. 11) of the front plate 131 of the tag chute 130 to clamp a tag securely in the proper position during a reading operation.

Mounted in a bracket 283, secured to the under side of the clamping block 181, is a roller 284, which is arranged to cooperate with a cam 285 (Figs. 5A and 31), secured to a shaft 286, mounted in the media reader auxiliary side frame 287 (Fig. 7A) and in a bracket 288, secured to a cross bar 289 in the media reader framework. Also secured to the shaft 286 is an arm 290 (Fig. 31), which is connected by a spring 291 to a lever 292, free on the shaft 281. A rounded surface 293 on the arm 290 is positioned to coact with an extension 294 on the lever 292, which is notched at 295 to receive a pin 296, fixed to the armature 297 of a rotary type solenoid L21, mounted in the media reader framework.

A snap-action switch, comprising contacts L21ac1 and L21bc1, is secured by means of a bracket 300 to the under side of the cross bar 289. An actuating member on the switch for operating said contacts is arranged for cooperation with an ear 301 on an arm 302, mounted free on the shaft 281 and secured by means of a hub 303 to the lever 292 for unitary movement therewith. A surface 304 on said arm is normally in contact with a stud 305, fixed in an arm 306, pinned to the shaft 281.

As will be described subsequently, the solenoid L21 is energized at the time the alining pins 173, 174, and 175 move through corresponding alining holes in a tag to their operative position. Energization of the solenoid L21 causes the armature 297 and the pin 296 to be rotated clockwise, as viewed in Fig. 31. Through the co-operation of the pin 296 and the arm 295, this imparts a clockwise movement to the lever 292 and the arm 302, which is fixed thereto. The ear 301 on the arm 302 is shifted into engagement with the actuating member of the switch to operate the contacts L21ac1 and L21bc1. During this time, the surface 304 of the arm 302 is shifted to the left, as viewed in Fig. 31, out of blocking relation to the stud 305, to permit clockwise rotation of the arm 306, the shaft 281, and the clamping block, with its legs 280. It will be recalled that the arm 306 and the legs 280 are pinned to the shaft 281.

At the same time, through the spring 291, the arm 290 is urged to follow the movement of the lever 292, thereby rocking the shaft 286 and the cam 285 clockwise. The cam 285 cooperates with the roller 284 to urge the clamping block 181 clockwise about the axis of the shaft 281 into operative clamping position to engage the tag being read and to clamp it firmly against the rear plate 132 of the tag chute. This movement of the block 181 to clamping position is also aided by the force of gravity, since the center of gravity of the clamping block assembly is located above and to the right of the axis of the shaft 281, as viewed in Fig. 5A.

Upon completion of the reading of the tag, the solenoid L21 is deenergized, and the armature 297, the pin 296, the lever 292, and the arm 302 are rotated counter-clockwise, as viewed in Fig. 31, under the influence of a spring 307, connected to the media reader framework and to a link 308, which in turn is pivotally connected to the lever 292. Counter-clockwise movement of the lever 292 causes the extension 294 of said lever to coact with the rounded surface 293 on the arm 290 to rock said arm, the shaft 286, and the cam 285 counter-clockwise, as viewed in Fig. 31. The arm 302, being fixed to the lever 292, also rocks counter-clockwise, thereby shifting the ear 301 out of contact with the actuating member of the switch to cause the contacts L21ac1 to reopen and the contacts L21bc1 to reclose. The counter-clockwise movement of the arm 302 also shifts the surface 304 of the arm 302 to the right to coact with the stud 305 of the arm 306 to rock said arm, the shaft 281, and the clamping block assembly counter-clockwise to the non-clamping position, in which they are shown in Fig. 5A.

Also mounted on the media reader framework is a time delay relay TD20 (Fig. 6) enclosed within a housing 565 (Figs. 5B and 6). The relay TD20 is composed of a plunger-type actuator, enclosed within a casing 571, and a relay 572, having a plurality of contacts TD20ac1 and TD20bc1. The actuator is energized simultaneously with the energization of the clamping solenoid L21. The energization of the actuator results in moving the plunger, which, after a predetermined time has elapsed, will make contact with the relay 572, thereby energizing said relay and opening the contacts TD20bc1 and closing the contacts TD20ac1. The manner in which these contacts function will be explained in the explanation of the operation of the error-detecting circuit.

Sensory section

The sensing means operates to read the data from the tag, column by column, while the tag is held stationary in reading position in the media reader by the clamping and alining means previously described. The sensing means in the instant embodiment is capable of sensing up to five different types of tags.

As stated earlier, sensing means are provided for sensing up to thirty-one columns on the tag, of which the first column to be sensed will customarily be an identification column for identifying the type of tag being read, and the other thirty columns will represent data which it is desired to record. Each of these columns may contain perforations in any of five positions.

The sensing means employed in the reading of the thirty data-representing columns will now be described. These sensing means differ in some particulars from the sensing means used in connection with the identification column, which will be described subsequently. The five sensing pins 171, shown in Fig. 5A, for sensing one of the data-representing columns of the tag, are arranged one above the other and are of a similar construction. Each sensing pin 171 is in the form of a Bowden wire which has its forward end operating in its respective hole 170 (Figs. 5A and 11) in the rear guide plate 132 of the tag chute 130, and has its rear end connected to an enlarged contact control rod 315, having a tip 316 of non-conducting material, which rod 315 is supported and guided for longitudinal movement in a cross bar 317, which is mounted between the right side frame 210 (Fig. 7B) and left side frame 318 (Fig. 7A).

Intermediate its ends, each of the sensing pins 171 (Fig. 5A) is mounted for longitudinal movement through the front supporting cross bar 202, mounted between the side frames, a sheath 319, and a further supporting cross bar 320, mounted between the side frames, the sheath 319 having its forward end extending into the cross bar 202 and its rear end extending into the cross bar 320.

Each sensing pin 171 is urged to the left (Fig. 5A) by its individual spring, such as spring 321, which forms a part of the contact means for converting the sensed data into electrical signals by which the recorder can be controlled to duplicate the data on the tag.

The contact means is common to the sensing pins for all of the data-representing columns on the tag and is shown most clearly in Figs. 5A, 7A, and 7B. The contact means is mounted between end frames 322 and 323, which are supported in auxiliary side frames 287 and 324 by means of two cross rods 325 and 326.

Supported between the end frames 322 and 323 are five input buses, 327, 328, 329, 330, and 331, one for each possible data-representing perforation in a column, which buses are electrically connected together by a strap 332.

As is clear from Fig. 5A, one end of each of the springs 321 is connected to its related input bus. One spring is secured to each bus for each data-representing column on the tag; that is, there is a row of thirty springs secured to the bus 327, each one of which will urge its related sensing pin to the left, to enable the top row of pins to sense the top row of perforations in the tag. Similarly, thirty springs will be mounted on each of the four other buses to urge their related sensing pins to the left.

Mounted to the left, as viewed in Fig. 5A, of each row of springs relating to the data-representing columns, and common thereto, is an output bus, the output buses 337, 338, 339, 340, and 341 being related to the top-to-bottom hole positions, respectively.

The springs 321 are positioned to engage their related output buses to selectively complete circuits from the common input buses to various ones of the output buses. Hence, the springs serve two functions; that is, to supply the force to move the sensing pins to the left, and also to serve as contacts in the circuits controlled by the sensing means.

The five output buses 337, 338, 339, 340, and 341 are connected to five terminals 1338 in a section 1336 in the diode digit encoding board 1315 (Fig. 39D), which is mounted in the recorder 100. The terminals 1338 can be connected by plug-board connectors, such as 1337, to terminals such as 1339 in the diode digit encoding board 1315 to select the punches to be operated according to the data which is read. In order to simplify the circuit diagram, the thirty contacts which connect an input bus to an output bus will be shown as a single contact, contacts SC36a1 representing the thirty contacts which connect the buses 327 and 337, contacts SC36a2 representing the thirty contacts which connect the buses 328 and 338, contacts SC36a3 representing the thirty contacts which connect the buses 329 and 339, contacts SC36a4 representing the thirty contacts which connect the buses 330 and 340, and contacts SC36a5 representing the thirty contacts which connect the buses 331 and 341. Hence, contacts SC36a1, SC36a2, SC36a3, SC36a4, and SC36a5 in Fig. 39D represent the various contacts which can be controlled in the sensing of any data-representing column of the tag.

In the normal, retracted, position of the sensing pins, their front ends will be flush with the rear plate 132 of the tag chute 130, and the tips 316 of the enlarged rods 315, which tips are notched to receive the springs 321, will hold the springs out of engagement with their related output buses.

As each column of sensing pins is released to sense the tag, those sensing pins which are in positions where there are holes in the tag will be allowed to move to the left to allow their related springs to engage the output buses and complete circuits from the input buses to the output buses, while those sensing pins which are in positions where there are no perforations will be prevented from moving to the left and will keep their related springs from engaging the output buses.

The movement of the sensing pins from their retracted position to their sensing position is controlled by a series of arms 342 (Figs. 5A, 7A, 7B, and 21), one for each of the thirty data-representing columns. The movement of the arms is controlled by a disabling bar 343, which is common to all of the arms, and by individual cams 344 of a cam line. The arms are pivotally mounted on a cross rod 345 and are guided laterally by a comb plate 346, secured to two blocks 347 and 348, said blocks being mounted on the side frames 318 and 210, respectively. The arms 342 are urged counter-clockwise, as viewed in Fig. 5A, by individual springs 349, which are connected to the arms 342 and to upwardly-extending ears 350 on the comb plate 346.

Each arm 342 is formed with a cam-engaging projection 351 and with an upwardly-extending finger 352, which engages the enlarged rods 315 of the five sensing pins for its related data-representing column. The finger 352 of the arm 342 extends along one side of the sensing pins of the column, as seen most clearly in Figs. 5A, 7A, and 7B. Each of the arms 342 is also provided with a surface 353 for engagement by the disabling bar 343 to maintain the sensing pins 171 in their right-hand position, except during the reading of a tag.

The disabling bar 343 extends the length of the cam line and is provided with trunnions 354 and 238 at opposite ends thereof, which trunnions bear in extensions 355 and 356 of the blocks 347 and 348 (Figs. 5A and 23), respectively, secured to the frams 318 and 210. Secured on the trunnion 238 adjacent the right-hand end of the disabling bar 343 is the arm 237 (Fig. 16), which is urged clockwise by the spring 239 and which is pivotally connected to the link 236.

It will be recalled that energization of the solenoid L20 at the beginning of a reading operation causes counter-clockwise rotation of the lever 214, as viewed in Fig. 16. This movement is transmitted by the link 236 and the arm 237 to the disabling bar 343, to rock said bar counter-clockwise against the force of the spring 239, thereby freeing the arms 342 (Fig. 5A) to the control of the cams 344 on the cam line.

At the completion of a reading operation, the solenoid L20 is deenergized, and the disabling bar is then rocked clockwise by the spring 239 (Fig. 16) to the position in which it is shown in the figures of the drawings, in which it is effective to block movement to the left of any of the cam arms. This blocking function is essential, since, as will be described subsequently, a resetting operation of the cam line normally follows completion of the reading of a tag. As the cam line moves through the completion of its revolution back to "home" position, in preparation for the next reading operation, certain of the arms would be permitted by their corresponding cams to move to the left, if not otherwise blocked against such movement, and this could cause erroneous reading and recording to take place. However, this is prevented by the disabling bar 343, which retains the arms 342 against leftward movement, as has been previously described.

The disabling bar 343 also prevents operation of the tag-ejecting means in the event that one of the sensing pins 171 fails for any reason to move back from its extended sensing position. This prevents damage to any of the sensing pins, which could otherwise very easily be damaged by operation of the ejecting means when any of said sensing pins were in their extended sensing position in the tag chute. In the event that one of the sensing pins becomes caught in a tag or is otherwise held in its extended position, the enlarged contact rod 315 (Fig. 5A), to which it is attached, will prevent full movement to the right of the corresponding arm 342. With any of the arms 342 held against completion of their normal movement to the right, as viewed in Fig. 5A, the disabling bar 343 will be unable to complete its normal clockwise movement upon deenergization of the solenoid L20. In such an event, the arm 237 and the link 236 will not complete their normal movements under the influence of the spring 239 upon deenergization of the solenoid L20, and the stud 240 on said link will therefore not shift the arm 233 sufficiently in a counter-clockwise direction to cause the pawl 231 to release the member 218 for operation of the ejecting means in the manner described previously. The disabling bar 343 thus cooperates with the various arms of the cam line to prevent an ejecting operation from taking place when any of the sensing pins 171 are in their extended sensing position.

The cam line (Figs. 5A, 21, 22, 22A, 23, and 29) contains thirty-two cams, including thirty cams for controlling the operation of the sensing means for the data-representing columns, one cam 357 (Fig. 21) for controlling the operation of the sensing means for the media identification section, and one cam 358 (Figs. 21 and 29) for controlling the operation of the validation means. Mounted on the same shaft 359 as the cams described above, for rotation therewith, are nine rotary switches, which cooperate with corresponding wipers for providing additional controls for the media reader. The shaft 359 is mounted in the right side frame 210 (Figs. 7B and 21) and in a plate 360 (Figs. 7A and 21) removably secured to the left side frame 318. The removable plate 360 is provided to permit ready removal of the cam line for inspection or adjustment.

A driving motor 333 (Figs. 5A, 7A, 7B, and 23) operates whenever the media reader is operable, and, through a shaft 361 (Figs. 5A, 7B, and 23), a clutch 362, and gears 363, 364, 365, 366, 367, 368, 369, and 370, drives the cam line through one thirty-sixth of a clockwise revolution (Fig. 23) each time the clutch 362, which is a single-revolution clutch, is tripped. Hence the clutch 362 will be tripped thirty-six times for each complete operation of the media reader, including a reset operation. Said clutch is tripped by a pair of clutch solenoids L22A and L22B, which when energized, remove a blocking member 371 from in front of a tooth 372 on the clutch to allow the clutch to make a single revolution. Movement of the blocking member 371 by energization of the solenoids L22A and L22B also causes the end of said member to coact with a pin 373 fixed in the end of a switch blade 374 to close contacts L22a1 and open contacts L22bc1 for purposes which will be disclosed in the description of the circuit diagram. The circuits for energizing the solenoids L22A and L22B will also be fully explained when the circuit diagram is described.

Secured to the clutch 362 for rotation therewith are two plates 375 and 376 (Figs. 7B and 23) of laminated plastic, each plate having a strip of conducting material extending part of the way around the periphery of said plate on one side. Wipers 377, mounted on the media reader framework, cooperate with the conducting strip on the plate 375 to form the contacts SC35a1, which are closed from five degrees to one hundred and thirty degrees of revolution of the clutch, and wipers 378, mounted on the media reader framework, cooperate with the conducting strip on the plate 376 to form the contacts SC35b2. The manner in which these contacts function in the operation of the recording system will be explained fully when the circuit diagram is described.

The cams on the cam line are formed with a notch 379 (Fig. 5A), of such a length as to be opposite the projection 351 on the related arm 342 only in one of the positions of the cam line, and are so proportioned that, while the projection 351 is riding on the periphery of the cam, the arm will be in position to maintain the sensing pins ineffective, but, when the notch 379 is opposite the projection 351, the arm can rock counter-clockwise to move the finger 352 to the left to free the sensing pins for movement to the left to sense the perforations of its related column and close the required ones of the contacts SC36a1 to SC36a5 inclusive.

The notches 379 on the cams 344 are arranged spirally about the shaft 359, so that, in different positions of the cam line, different ones of the arms 342 will be allowed to free the corresponding sensing pins. In the instant embodiment, when the clutch 362 is tripped for the first time in the tag-reading operation, no reading of the tags takes place, since this is simply a preparatory operation of the media reader to provide time for the various components of the media reader to assume their correct positions for the reading of the tag. When the clutch is tripped a second time, the first column at the left of the tag will be sensed. This is the identification column, and the sensing means for this column will be described subsequently. When the clutch is tripped a third time, the second column at the left of the tag will be sensed. This is the first data-representing column, and, as the clutch is tripped further in the reading operation, the subsequent data-representing columns will be read one after another from left to right.

While in the instant embodiment the notches 379 are so arranged about the shaft 359 that the tag is read column by column from left to right, it is obvious that, by proper location of the notches on the various cams, the columns on the tag can be read in any sequence which may be desired.

The media reader can be controlled to read all thirty-one columns on the tag, or any desired number of columns. This control is effected by the "end of tag" contacts. In the present embodiment, it is contemplated that there will be five different sets of "end of tag" contacts, one each for the clerk and customer number tags, and one each for the three different lengths of merchandise tags. The "end of tag" contacts SC21b1, SC22b1, SC30b1, SC31b1, and SC32b1, respectively, are formed by the five rotary switch plates 384, 385, 386, 387, and 388 (Figs. 21 and 22A), mounted on the shaft 359, in cooperation with corresponding sets of wipers 389. Each of the "end of tag" switch plates comprises a laminated plastic plate 390, having inlaid on both sides thereof a strip 391 of conducting material. The strips of conducting material on each side are connected by a bridge, also of conducting material, inlaid on the periphery of the plastic plate. One of the two wipers 389, cooperating with each of the plates, serves as input, while the other serves as output. It will be seen that, so long as the conducting strip on the plate is in contacting relation with the wipers, current will pass from the input wiper to the output wiper. However, when the plate is rotated to a point where the non-conducting plastic material contacts one or both of the two wipers, the electrical connection therebetween will be broken.

Four additional rotary switch plates are fixed on the shaft 359 to the left of the cam line (Fig. 21). Two of these plates, 392 and 393, cooperate with wipers 394 to provide contacts SC33a3 and SC33a4, which contacts are open in home position of the media reader cam line, but which are closed in all other positions of said cam line. The construction of these "open in home" contacts is identical with the construction of the "end of tag" contacts, previously described, with the exception that the plates 392 and 393 are designed to remain fixed in relation to the media reader cam line, while the five "end of tag" plates are designed to be adjustable to different positions about the media reader cam line.

A third plate, 395 (Figs. 21 and 22), is fixed in relation to the media reader cam line and is designed to cooperate with two sets of wipers 396 and 397 to provide a set of "closed in home" contacts SC33b1. The construction of this plate is similar to that of the plates previously described, in that the plate comprises a plastic laminated member having inlaid thereon two metal strips 398 on opposite sides of the plate. However, in this instance, the two metal conducting strips are not connected across the periphery of the plate but are electrically separated. One of the wipers 396 on one side of the plate acts as an input, while the other wiper 397 on the same side of the plate acts as an output in this case. It will therefore be seen that the contacts SC33b1 will be closed only when both of the wipers 396 and 397 are in contact with the metal strip 398 of the plate 395 during a certain portion of the rotation of said plate.

A fourth plate, 399, on the left side of the media reader cam line, is similar in construction to the plate 395 and is designed to provide contacts SC34a1, SC34a2, and SC34b2, in cooperation with the wipers 400 and 401. The plate 399, unlike the plate 395, which is fixed with respect to the media reader cam line, is adjustable about the cam line, so that its relative positioning with respect to the position of the media reader cam line may be adjusted as desired. The manner in which these contacts function in the operation of the recording system will be explained fully when the circuit diagram is described.

All of the rotary switch plates and cams of the cam line are mounted on the shaft 359 (Figs. 5A and 21) in a novel manner which provides accuracy and simplicity of assembly and easy adjustability of those cams and switch plates which it is desired to be adjustable around the shaft. Pinned to the shaft 359 between each pair of cams 344 is an arm 402 (Figs. 5A and 21), having a hole at one end thereof. One of the cams 344 rests against each side of the arm 402, each of the cams 344 being identical in shape, having a single notch 379 therein and thirty-six holes equally spaced along a circumference near the periphery of the cam. Three-armed spring members 403 (Figs. 5A and 21) are positioned on the shaft 359 between adjacent arms 402 and bear against adjacent cams 344 to hold said cams against the arms 402 for accurate spacing of said cams on the shaft 359.

A similar construction is followed in the case of the various rotary switch plates which are mounted on the shaft 359. However, since the switch plates have electrical contact surfaces extending along the peripheries, it is necessary to make the arms 404, which are pinned to the shaft 359, somewhat shorter than the corresponding arms 402, utilized with the cams 344, and therefore to provide a notch 405 in the top of the arms 404 rather than a hole, as in the corresponding arms 402. Also, since the plastic plates 390 do not have the rigidity of the cams 344, a spacing member 406 (Figs. 21 and 22) is provided to occupy the space around the arms 404 and between adjacent plates 390, and washers 407 are provided adjacent the plates 390 to form bearing surfaces for the three-armed springs 408 (Figs. 21 and 22A), which are similar to the corresponding spring members 403, used for spacing the cams 344.

A rod 409 (Figs. 5A, 21, 22 and 22A) cooperates with the holes in the cams 344 and the switch plates, with the holes in the arms 402, and with the notches 405 in the arms 404, to retain all of said members against rotational movement relative to each other and to the shaft 359. The rod 409 is retained against shifting movement lengthwise of its axis by two clips 410 (Fig. 21) which cooperate with grooved portions in said rod to retain the rod against axial movement. This type of construction enables the use of identical cams 344, since the relative position of notches 379 in adjacent cams can be set about the shaft 359 merely by positioning the cams 344 in the desired relationship to each other, and then passing the rod 409 through the particular hole in each cam 344 which has been alined with said rod by the relative positioning of the cam. The position of the rod 409 with respect to the shaft 359 is fixed, since said rod passes through holes and notches of the arms 402 and 404, which, it will be recalled, are pinned to the shaft 359. Since it is desired to retain the switch plates 392, 393, and 395 in fixed relation to the shaft 359 to establish a "home" position, these plates are provided with only one hole for reception of the rod 409 and cannot be rotatably adjusted with respect to the shaft 359. However, the remainder of the switch plates, and the cams for the cam line, are each provided with thirty-six holes in a circumference near their periphery and can thus be adjusted in any desired position simply by removal of the rod 409, rotation of the cam or plate about the shaft 359 to its desired position, and then replacement of the rod 409 to secure all of the cams and switch plates against movement relative to each other.

The sensing means employed in the reading of the identification column, which is normally the first column to the left of the tag, is positioned at the left side of the sensory section, as viewed in Fig. 7A. Each of five vertically-arranged sensing pins 171, composing the identification column sensing means, is mounted for longitudinal movement in a sheath 319 extending between the supporting bars 202 and 320 in the same manner as the sensing pins for reading the data-representing columns on the tag. The rear end of each sensing pin 171 is connected to an enlarged control rod 411 (Figs. 8, 9, and 27), having a tip 412 of non-conducting material, each of the rods 411 being supported and guided for longitudinal movement in the cross bar 317. Each sensing pin 171 of the identification section is urged to the left by a spring 413 (Fig. 28), which presses against the tip 412 at the end of the rod 411 connected to the pin 171. The spring 413 also forms part of the contact means for converting the sensed data into electrical signals for controlling the recording system, according to the type of tag inserted into the media reader.

After the disabling bar 343 has been moved to its non-blocking position by energization of the solenoid L20, the movement of the sensing pins 171 of the identification section from their retracted position to their sensing position is controlled by an arm 414 (Figs. 9 and 31), identical in shape with the cam arms 342, pivotally mounted on the cross rod 345 and urged counter-clockwise by a spring 415, connected between said arm and the comb plate 346. The arm 414 is controlled by the solenoid L21, through the link 308, which is pivotally connected to said solenoid and to a lever 416, pivotally mounted on the frame member 287, said link being urged to the left, as viewed in Fig. 31, by the spring 307. At the lower end of the lever 416 is fixed a stud 417, which cooperates with a surface 418 on the arm 414 to control the movement of said arm.

When the solenoid L21 is in its deenergized position, as shown in Fig. 31, the lever 416 is positioned by the link 308, under the influence of the spring 307, so that the stud 417 coacts with the surface 418 to block movement of the arm 414 under the influence of the spring 415. The sensing pins 171 (Fig. 8) of the identification section, are herefore, prevented from moving to their sensing position.

Energization of the solenoid L21 at the beginning of a reading operation causes the link 308 to be shifted to the right against the force of the spring 307, thus rocking the lever 416 clockwise about its pivot and moving the stud 417 out of blocking relation to the surface 418. The arm 414 is thereby permitted to rock counter-clockwise about the rod under the influence of the spring 415, releasing the pins for sensing movement to sense the identification column of the tag being read. At the end of a tag-reading operation, the solenoid L21 is deenergized, which permits the link 308 to be shifted to the left by the force of the spring 307. This rocks the lever 416 counter-clockwise and causes the stud 417 to coact with the surface 418 to return the arm 414 to the position in which it is shown in Fig. 31, thereby moving the sensing pins controlled by it to their retracted position.

Supported and guided for longitudinal movement in the cross bar 317 adjacent each of the rods 411 is a companion rod 419 (Figs. 9 and 27), having a tip 420, of non-conducting material. Each of the rods 419 is urged to the left, as viewed in Fig. 27, by the cooperation of a spring 421 with the tip 420 at the end of the rod 419. The spring 421 also forms a part of the contact means which may be used for recording an identification symbol or for various other purposes, as will be described subsequently.

Each of the rods 419 is jointly controlled by its companion rod 411 and by a cam arm 422 (Figs. 9 and 21), identical in shape with the cam arms 342 and cooperating with the cam 357 on the cam shaft 359 (Fig. 21). A cut-out portion 423 (Figs. 8 and 9) is provided on each of the rods 411 and cooperates with a cut-out portion 424 on the corresponding one of the rods 419. The rods 411 and 419 are so positioned in the cross bar 317 that communication between the cut-out portions 423 and 424 is furnished by a bore 425, in which rides a ball 426 of a diameter larger than the length of the bore. An extension 427 of the bore 425 facilitates placement of the ball 426 in the bore 425 during assembly.

It will be seen that, so long as the rod 411 remains in the retracted position, in which it is shown in Fig. 9, its cut-out portion 423 is not directly opposite the bore 425, and the ball 426 will, therefore, protrude from said bore into the cut-out portion 424 of the rod 419 and retain said section against movement to the left, as viewed in Fig. 9.

Full sensing movement to the left, as viewed in Fig. 9, of any of the rods 411 whose sensing pin 171 passes through a perforation in the identification section of the tag being read positions the cut-out portion 423 of said rod 411 directly opposite the bore 425 in the bar 317. Then, at a predetermined time in the tag-reading operation, when the arm 422 is permitted to move to the left, as viewed in Fig. 9, by its cam 357 on the cam shaft 359, the rod 419 will be shifted to the left by its spring 421 (Fig. 28). With the cut-out portion 423 directly opposite the bore 425, the ball 426 does not retain the rod 419 against movement, since said ball may be cammed by a surface on the cut-out portion 424 out of its blocking position and into the space provided by the cut-out portion 423. The rod 419 is thus permitted to move to the left, as viewed in Fig. 9, under the influence of its spring 413. The arm 422 and the rod 419 are subsequently caused to return to the position in which they are shown in Fig. 9 by continued rotation of the cam 357, which controls the arm 422.

The contact means for the identification section of the sensing means is shown in Figs. 7A, 27, and 28 and is mounted in the same framework as the contact means for the data-representing section but is electrically isolated therefrom. Those portions of the input buses 327 to 331 inclusive and the output buses 337 to 341 inclusive which lie opposite the rods 411 and 419 are reduced in cross-sectional area, as shown in Figs. 27 and 28. Positioned on the reduced portion of each of the output buses 337 to 341 inclusive is a sleeve 428, of insulating material, having a lip 429 at its end adjacent the shoulder on each of the input buses between the reduced portion and the non-reduced portion. A first common plate 430 is mounted on the sleeves 428 of the three buses 337, 338, and 339 adjacent the lip, and a second common plate 431 is mounted on the sleeves 428 of the two buses 340 and 341 adjacent the lip 429. A grooved collar 432 is mounted on each of said sleeves 428 next to and in electrical contact with the plates 430 and 431. Adjacent the collar 432 are placed two insulating washers 433 and 434 to electrically isolate the collar 432 from a second grooved collar 435, mounted on each of the sleeves 428. On the opposite side of the collars 435 and in electrical contact therewith are another common plate 436, identical in shape with the plate 430, mounted on the sleeves of the buses 337, 338, and 339, and another common plate 437, identical in shape with the plate 431 and mounted on the sleeves of the buses 340 and 341. Spacing members 438 and 439 retain the various elements mounted on each of the sleeves 428 in proper spaced relationship to the end frame 322. The common plates 430 and 431 are electrically connected together to form an input bus for the collars 432, and the common plates 436 and 437 are electrically connected together to form an input bus for the collars 435.

Positioned on the reduced portion of each of the buses 327 to 331 inclusive is a sleeve 440, of insulating material. The springs 413 and 421 for each of the five sensing rods 411 and the five companion rods 419, respectively, are mounted on the sleeves 440 and are spaced apart by insulating washers 441, one of which is positioned on each sleeve 440 between two of the springs 413 and 421, and the other of which is positioned between the spring 421 and the spring 321 for the endmost data-sensing column.

Each of the springs 413 and 421 is provided at one end with a hook formation for engagement with a corresponding slot in the insulating tips 412 and 420 attached to each of the rods 411 and 419. The central portions of the springs 413 and 421 are coiled about the sleeves 440, and the other ends of said springs extend through apertures 442 (Figs. 7A and 27) in laminated plates 443 and 444 and are bent to form output terminals 445 for connection to the recording system circuit, as will be completely described in the explanation of the circuit diagram, Figs. 39A to 39D inclusive.

In the normal, retracted, position of the sensing pins of the identification section, the corresponding rods 411 and 419 will hold the springs 413 and 421, respectively, out of engagement with the collars 435 and 432. As the sensing pins of the identification section are released to sense the tag, the sensing pin which is in a position where there is a hole in the tag will be allowed to move to the left, as viewed in Fig. 9 to allow its corresponding spring 413 to engage its collar 435 connected to the input bus 436 and complete a circuit to the output terminal 445 on said spring. The companion rod 419 to the selected rod 411 will move leftward, as viewed in Fig. 9, at a time determined by the setting of the cam which controls the arm 422, which in turn controls the movement of the rod 419. This will allow the corresponding spring 421 (Fig. 28) to engage the collar 432 connected to the input bus 430 and complete a circuit to the output terminal 445 on the spring 421.

The rods 411 and 419 controlled by sensing pins which are in positions where there are no perforations will be prevented from moving to the left and will keep their related springs from engaging their corresponding collars.

Located on the media reader framework are the relays K22 and K21 (Fig. 5B). The relay K22 is energized upon the movement of one of the sensing pins through a corresponding hole in the tag. The manner in which the relays K22 and K21 function will be explained fully when the circuit diagram is described.

*Validation means*

Means are provided in the media reader for embossing each merchandise tag read to denote that the tag and the article to which it is attached have been purchased from the establishment using the recording system.

The embossing is effected by small prongs 451, fixed to the face of a validating hammer 452 (Figs. 29 and 30), which is supported and guided for longitudinal movement in the cross bar 202. An aperture in the rear guide plate 132 of the tag chute 130 permits movement of the hammer 452 through said plate for the embossing of a tag positioned in the tag chute. A backing plug 453, of nylon or other suitable material, is set into the clamping block 181 opposite the hammer to act as a stop for movement of said hammer.

Movement is imparted to the hammer 452 through an extension 454, to which said hammer is pivotally connected and which is slidably supported in a slot in a two-part member 455, supported on the cross bar 320 by means of bolts 456. Sleeves 457 on the bolts hold the member 455 spaced from the bar 320.

A surface 458 on the extension 454 is positioned for cooperation with a corresponding surface 459 on an arm 460, mounted on the cross rod 345 and having a surface 461 and a roller 462 thereon. The arm 460 is urged counter-clockwise, as viewed in Fig. 29, by a spring 463 connected to said arm and to the comb plate 346 (Fig. 5A) to normally maintain the surface 461 (Fig. 29) and the roller 462 in contact with the corresponding surfaces of two members 464 and 465 secured together to form the cam 358 fixed to the shaft 359. The members 464 and 465 are connected for unitary movement by the shaft 359 and by the rod 409, the member 465 being pinned to the shaft 359 and performing the function of one of the arms 402, as well as a camming function.

The arm 460 is cut away opposite the disabling bar 343, so as to provide clearance for said arm in making its normal hammer-actuating movement to the left, as view in Fig. 29. However, under certain circumstances, the bar 343 may act as a stop for said arm, as will be described subsequently.

A rearwardly-extending offset finger 467 on the extension 454 has, at its end, a bent-over ear 468 to coact with a surface 469 on the arm 460.

At a predetermined point in a reading operation, the surface of the cam member 465 will move clockwise past the edge of the surface 461 of the arm 460, thereby permitting said arm to move abruptly to the left, as viewed in Fig. 29, under the influence of the spring 463. Such movement causes the surface 459 on the arm 460 to strike the surface 458 on the extension 454 and to carry said extension and the hammer 452, attached thereto, to the left with the arm 460, thus causing the prongs 451 on the hammer 452 to emboss an appropriate mark on the merchandise tag being read. It will be recalled that clerk tags and customer tags are cut away opposite the hammer 452 and therefore will not be embossed. In either event, the plug 453 in the clamping block 181 acts as a stop to halt movement of the hammer 452, the extension 454, and the arm 460 to the left, as viewed in Fig. 29. If, for any reason, the validating means should be caused to operate at a time when the clamping block 181 is in its retracted position rather than the position in which it is shown in Fig. 5A, as, for example, during a resetting of the cam line, the plug 453 would not be positioned to act as a stop for the hammer 452, the extension 454, and the arm 460. In such a case, a surface 470 of the arm 460 would strike the disabling bar 343 to stop movement of the arm 460 to the left, and the ear 468 of the extension 454 would cooperate with the surface 469 on said arm to limit movement of the extension 454 and the hammer 452 to the left.

Following an embossing operation, the arm 460 is shifted to the position in which it is shown in Fig. 29 by cooperation of the roller 462 on said arm with the periphery of the cam member 464. The surface 469 on the arm 460 coacts with the ear 468 on the extension 454 to shift said extension and the hammer 452 to the right with the arm 460.

Means are provided to lock the validating means against operation. Mounted on the side frame 210 by means of bolts 471 (Figs. 7B and 29) is a lock housing 472. A lock cylinder 473 is rotatably mounted in said housing and has fixed thereto an eccentric 474. An arm 475 is provided with a surface 476, which is positioned to coact with the eccentric 474. Said arm 475 is pinned to a shaft 477, which extends through a hole in the auxiliary frame member 324 and is mounted in a bracket 478, secured to the upper surface of the cross bar 317. Also fixed to the shaft 477 is the arm 235, which has connected thereto at its free end the spring 234, which, it will be recalled, is connected at its other end to the arm 233 (Fig. 16). A further arm, 479, is secured to the shaft 477 near the bracket 478 and is slotted at its free end to receive a stud 480, mounted on an ear 481 of a detent 482, which is mounted for sliding movement in a slotted portion 483 of the bracket 478. The lower end of the detent 482 is curved to coact, in a certain position, with a shoulder 484 on the upper end of the arm 460 to prevent movement of said arm to the left, as viewed in Fig. 29.

A key 485 (Fig. 7B), which will turn the lock cylinder, is provided and will normally be retained by a person supervising the operation of the recording system. By turning the lock cylinder in one direction or the other, it is possible selectively to lock or to unlock the validating means.

It will be seen that, with the lock cylinder 473 in the position in which it is shown in Fig. 29, the lower end of the detent 482 is out of the path of movement of the shoulder 484 of the arm 460, and the validating means is therefore not locked against operation.

To lock the validating means, the key 485 is inserted into the lock cylinder 473, and the two are turned one hundred and eighty degrees in either direction, depending upon the design of the lock cylinder and housing. This causes the eccentric 474, which is fixed to the cylinder 473, to rock the arms 475, 235, and 479 and the shaft 477, to which said arms are fixed, counter-clockwise, as viewed in Fig. 29, against the force of the spring 234. The edge of the slot in the arm 479 coacts with the stud 480 to shift the detent 482 downwardly to position its lower end in the path of movement of the shoulder 484 of the arm 460 to prevent movement of said arm under the influence of the spring 463, which would otherwise take place when the shoulder on the cam member 464 passed out from under the surface 461 on the arm 460.

To unlock the validating means, it is simply necessary to turn the key 485 in a direction opposite to that in which it was turned to lock said means, which causes an operation the reverse of that described above to take place.

*Manual tag ejecting and switching means*

Manually-operable means are provided for ejecting a tag or other record member which has erroneously been inserted into the tag chute to the right of the reading section, as viewed in Figs. 7A and 7B. Anything thus inserted will slip past the reading section and the tag stop means associated with the reading section, to a position in which it is inaccessible to the operator. The mechanism being described is provided to enable the removal of such a tag or other member from the tag chute. In addition, the manually-operable means control certain electrical contacts which in turn control the tag release, as will be described subsequently.

A depressible key or push button 490 (Figs. 1, 24 and 26) is slidably mounted on the auxiliary side frame member 324 by means of studs 491 and 492, fixed in said member 324, which cooperate with vertically-elongated slots in the stem 493 of the key 490. The key 490 is normally urged to an undepressed position by a spring 494, which is connected between the stud 491 and a stud 495, fixed to an extension 496 of the stem 493 of said key. Fixed in the stem 493 is a long stud 497, which is free to move in a cut-out portion 498 (Fig. 23) of the frame member 324. The stud 497 extends through holes in an arm 499 and a bail 500, both of which are pivoted on a shaft 501, fixed in the right side frame 210.

The bail 500 has two studs 502 (Figs. 24, 25, and 26) fixed thereto, which studs extend into the tag chute 130. Loosely mounted on said studs, by means of holes therein which cooperate with the studs, is an ejecting plate 503 (Figs. 25 and 26), which is positioned within the tag chute. Depression of the key 490 will cause the stud 497, secured thereto, to rock the bail 500 counter-clockwise, as viewed in Fig. 26, and thereby shift the ejecting plate 503 upwardly in the tag chute 130. Any tag or other record member which has been dropped into the tag chute 130 and which is positioned above the ejecting plate 503 will therefore be shifted upwardly to a position in which it may be readily grasped by the operator and removed from the tag chute.

Means are provided to prevent depression of the key 490 during a reading operation of the media reader, since a tag or other member being held in reading position by the alining and clamping means may extend over above the ejecting plate 503, so that upward movement of said plate during a reading operation might cause damage to the media reader or to the tag or other member, or both.

Fixed on the lever 214 (Fig 16) is a stud 504, which is positioned for coaction with a surface 505 on the arm 499. It will be recalled that the lever 214 is moved in response to energization and deenergization of the solenoid L20. Energization of the solenoid L20 positions the stud 504 in the path of movement of the surface 505 on the arm 499 to block upward movement (Fig. 16) of said arm. This prevents depression of the key 490 by blocking the stud 497 on the stem 493 of said key against downward movement (Figs. 24 and 26). Deenergization of the solenoid L20 permits the spring 239 to shift the lever 214 clockwise about the axis of the shaft 215 and thereby move the stud 504 out of blocking relation to the surface 505 of the arm 499 to permit depression of the key 490.

A bracket 506 (Figs. 7B and 24) is secured to the bar 289 and has fixed thereto a pair of snap-action switches comprising the contacts SP24*b*2 and SP24*b*1, respectively. The actuating members of these switches are held in retracted position by a flat end surface 507 on the key stem 493 when the key 490 is not depressed. Depression of the key 490 shifts the surface 507 downwardly (Fig. 24), thereby permitting the actuating members of said switches to move outwardly to open the contacts SP24b1 and SP24b2. The key 490, upon being released by the operator, is urged upwardly to its undepressed position by the spring 494, thereby causing the surface 507 to coact with the actuating members of said switches to close the contacts SP24b1 and SP24b2. The functions performed by the contacts SP24b2 and SP24b1 will be fully explained when the circuit diagram of Figs. 39A to 39D inclusive is described.

*Selector switch unit*

Means for controlling the sequence of operation of the recording system are mounted in a unit which is carried in the media reader and which may readily be removed from the media reader for replacement by another similar means, which will control the recording system for a different sequence of operation.

A base 510 (Figs. 5A, 32, and 37) supports the components of the selector switch unit. In operative position, the base 510 rests upon the base plate 511 (Fig. 6) of the media reader. Positioning studs 512 in the base base plate 511 cooperate with fingers 513 on the base 510 to insure correct placement of the base 510 on the base plate 511, and a screw 514, cooperating with a slot 515 in the base 510 and threadedly engaging the base plate 511, secures the base in its proper position. The various leads from the electrical components on the base 510 are fixed to terminals of two plugs 516, mounted on a bracket 517, secured to the base. Said plugs are arranged to engage mating plugs 516A, fixed to the media reader framework, to complete electrical connections between the components of the selector switch unit and the remainder of the recording system.

One of the components of the selector switch unit is a multiple-position, multiple-level selector switch 518. This switch is mounted between a flange 519 (Fig. 32), bent upwardly from the base 510, and a vertical portion 520 of a bracket 521, secured to the base 510. The selector switch comprises a plurality of sets of wafers and a plurality of rotatable wipers, one wiper cooperating with each set of wafers. Each set of wafers comprises a first wafer 522 (Fig. 35) and a second wafer 523 (Fig. 36). The first wafer 522 comprises a ring of non-conducting material, having four common sectors 524 mounted therein, each sector having a terminal 525 extending outwardly of the outer surface of the ring. Two diametrically-opposed ears 526 are formed on the ring, each ear having therein a bore to receive a bolt 527 for securing the switch in assembled relation and mounting it between the flange 519 and the bracket 521.

Each of the wafers 523 comprises a ring of non-conducting material, in which are mounted twelve equally-spaced short sectors 528 of conducting material, each sector having a terminal 529 extending outwardly from the outer surface of the ring. Two diametrically-opposed ears 530, having therein bores for the reception of the bolts 527, are provided on the ring.

The wipers 531 (Figs. 33 and 34) are positioned between the wafers 522 and 523. Each wiper 531 includes a hub 532 fixed on a shaft 533 for rotation therewith. Attached to the hub 532 and spaced ninety degrees from each other are four sets of wiper blades 534, each set consisting of two wiper blades, the ends of which are curved in opposite directions, so that one of said wiper blades will coact with the conducting sectors 524 of one of the wafers 522, while the other blade 534 of the set will coact with the sectors 528 of the wafer 523. The shaft 533, on which all of the wipers 531 are mounted, is journaled in the vertical portion 520 of the bracket 521 and in the flange 519. The wafers 522 and 523 are mounted in their proper assembled relationship on the flange 519 and the vertical portion 520 of the bracket 521 by means of the bolts 527 and are spaced from the flange 519 by means of sleeves 535 on the bolts 527.

The shaft 533 extends through the vertical portion of the bracket 521, and a ratchet 536 (Figs. 32 and 37) is mounted on its end. A pawl 537, having a tooth 538 for coaction with the teeth of the ratchet 536, is provided for shifting said ratchet step by step to rotate the shaft 533 and the wipers 531, fixed thereto, relative to the assembled sets of wafers 522 and 523. Secured to the bracket 521 is a solenoid SS20, of the rotary type, having an armature 539, in which is fixed a pin 540, which cooperates with a slot 541 in the pawl 537. The slot 541 is slightly longer than the pin 540 to permit some lost motion between the two.

Mounted adjacent to the solenoid SS20 by means of a bracket 562 secured to the base 510 are a pair of snap-action switches comprising the contacts SS20b14, SS20ac13, and SS20bc13. These switches are controlled by a blade 563, operated by the solenoid SS20, through a member 564, which has an in-and-out movement during energization and deenergization of said solenoid.

Pivotally mounted on the vertical portion 520 of the bracket 521 by a stud 542 is an arm 543, having a roller 544 mounted at one end for cooperation with a curved stop surface 545 on the pawl 537. A limited extent of movement may be given to the arm 543 for precise positioning of the roller 544 with respect to the surface 545 on the pawl 537 by adjustment of an eccentric 546 mounted in the vertical portion 520 of the bracket 521 and cooperating with a slot 547 in said arm. A spring 549 is connected at one end to a stud 550, fixed to the eccentric 546, and at the other end to a stud 551, extending between two ears on the pawl 537, and urges the surface 545 of said pawl against the roller 544. Connected between the stud 551 and the armature pin 540 is a second spring 552, which urges the armature pin 540 to bear against the left edge of the slot 541, as viewed in Fig. 37.

A blade 553, fixed to a support 554, cooperates with the teeth of the ratchet 536 to prevent retrograde movement of said ratchet. The support 554 is adjustably mounted on the vertical portion 520 of the bracket 521 by means of bolts 555 on the support, which ride in a horizontal slot 556 in the vertical portion of the bracket 521.

Energization of the solenoid SS20 causes the pin 540 to move to the right, as viewed in Fig. 37. The pin 540, after traversing the slot 541, coacts with the right edge of said slot to shift the pawl 537 to the right against the force of the spring 549, thereby moving the tooth 538 on said pawl past one of the ratchet teeth, said ratchet being held by the blade 553 against clockwise or retrograde movement. When the solenoid SS20 is subsequently deenergized, the pawl 537 is shifted back to the left by the spring 549, and the tooth 538 on said pawl cooperates with a tooth on the ratchet 536 to step said ratchet one step in a counter-clockwise direction of movement, as viewed in Fig. 37. In the same manner, each energization and subsequent deenergization of the solenoid SS20 is effective to step the ratchet 536 one step in a counter-clockwise direction.

The manner in which the various electrical contacts controlled by the mechanism of the selector switch unit function in the operation of the recording system will be fully explained when the circuit diagram of Figs. 39A to 39D inclusive is described.

A cover 557 is provided for the selector switch unit to protect said unit against possible damage. The cover rests upon a gasket 558, fastened to the base 510, and is secured in place by a first bolt 559, threadedly engaging the upper end of a post 560, secured to the base 510, and by a second bolt 561, threadedly engaging the bracket 517.

Detachable means are provided for electrically connecting the media reader to the other components of the recording system. For a description of these detachable means and the manner in which they operate, reference should be made to the previously-mentioned United States patent application, Serial No. 622,591.

It will be seen, from an examination of Figs. 35 and 36, that each set of wafers 522 and 523, together with the corresponding wiper 531, comprises four levels or sets of contacts of the selector switch. Each of the four sections on the wafer 522 constitutes a common for one of the levels, while each of the twelve short sectors 528 on the wafer 523 constitutes one of three positions of each level. Each of the sets of wiper blades 534 on the wiper, therefore, conducts current from a common sector on a wafer 522 to one of the position sectors on the wafer 523, and, as the selector switch is stepped, the wiper blades 534 advance, so that the wiper blade which is in contact with the position sectors 528 of the wafer 523 advances from one sector to the next. As each set of wiper blades advances, it steps through one level and then onto the first position sector 528 of an adjacent level, while a following set of wiper blades 534 steps to the No. 1 position of said one level. Therefore, the effect is that in each level an electrical circuit is completed successively to position No. 1, then position No. 2, position No. 3, position No. 1, etc. In the illustrated embodiment, the selector switch contains three sets of wafers 522 and 523, with four levels in each set, for a total of twelve levels. It is obvious, however, that a switch of this type might contain a different number of levels or a different number of positions in each level, if desired.

Also mounted on the base 510 is a relay K20, having a plurality of sets of contacts K20bd1, K20a2, K20ad1, K20bd1, K20ac12, K20bc12, and K20ad11, which are arranged to be opened or closed by energization or deenergization of said relay. The manner in which these contacts operate will be explained in the following section.

*Circuit diagram*

As has been previously stated, the media reader within which the present invention is embodied is part of a data-recording system comprising, in addition to the media reader, a recorder and a cash register. A diagrammatic representation of the manner in which the electrical components of the media reader, the recorder, and the cash register are arranged and connected to form a data-recording system is shown in Fig. 38. Those circuits which are concerned with the operation of the media reader and the recording of the data read by the media reader are shown in detail in the circuit diagram of Figs. 39A to 39D inclusive. Since the remainder of the recording-system-operating circuit shown broadly in Fig. 38, specifically those circuits which are associated with the operation of the cash register and the tape recorder, is substantially the same as that disclosed in detail in the previously-cited United States patent application, Serial No. 622,591, of Richard L. Ditmer et al., such circuitry is not shown or described in detail herein, but reference may be had to the above-cited application for a detailed description thereof.

It is believed that the circuits may best be explained by a description of them as they function in preparing the apparatus for operation and in carrying out typical operations of the apparatus. In this explanation, it will be assumed that the cash register, the media reader, and the recorder have previously been operated through a complete transaction and are in home position, ready to receive the entries of a new transaction.

Power is turned on by closure of the main power switch 125 (Fig. 1), which is located on the cash register cabinet. The operation of the switch 125 closes contacts (not shown) located in the cash register 102, to complete a circuit to make the usual 117-volt, 60-cycle A.C. available to the cash register motor 1300 (Fig. 39A), the media reader motor 333, and the recorder motor 601 (Fig. 39B), and, through the rectifier 598, to supply D.C. operating potential to the control circuits over conductors 1304 and 1305 (Fig. 39B).

Application of operating potential to the recording system causes a visual condition indicator (not shown) to light, indicating that operating potential is being applied. In addition, a contactor relay is energized in the recorder operating circuit to prepare the recorder for operation. A "Leader Advance" operation may be performed at this time by depression of a push button on the recorder to produce a "Leader Advance" or "Run-In" code on the recording tape, as is customary to prepare it for use with a computer system, auxiliary card-puching equipment, or other data-processing apparatus. All of the above is fully shown and explained in the previously-cited United States patent application, Serial No. 622,591, of Richard L. Ditmer et al.

After the "Leader Advance" code has been punched, the recording system is ready to record a transaction. For purposes of illustration, it will be assumed that the transaction to be described is a charge sale; that a single item of merchandise is involved; that tags will be used for clerk and customer identification; that a tag will be used for merchandise description; and lastly that the selector switch 518 (Fig. 32), with its various sets, or levels, is in its first position.

Since this is a charge sale, a Charge control key on the cash register keyboard is depressed, which causes contacts SC61a1 (Fig. 39B) to close, contacts SC47ac1 (Fig. 39C) to close, and contacts SC47bc1 (Fig. 39C) to open.

A clerk identification tag is then inserted into the media reader in order that a record of the identity of the clerk handling the transaction will be punched in the tape. Proper insertion of the tag causes contacts SC23a1 (Fig. 39B) to close, which completes an energizing circuit from the conductor 1304 to an alining pin and reset solenoid L20 (Fig. 39B) through contacts K3ac11, controlled by a recorder contactor relay; a conductor 1316; the relay switch K20bd1; the contacts SP24b1; SC23a1; SC37b1; L22bc1; and K21b13; the solenoid L20; the contacts SC61a1, which have been closed by depression of the Charge key in row 9 of the cash register; and the normally-closed contacts SC60b1. The contacts SC60b1 are opened by the rotation of a key lock line (not shown) in the cash register to prevent the operation of the media reader during the operation of the cash register. However, they are closed at this time, since the cash register has not been tripped for operation. Energization of the alining pin and reset solenoid L20 causes contacts L20b1 (Fig. 39A) in the circuit for initiating operation of the cash register to open, and also causes the alining pins to move forward for engagement with corresponding alining holes in the clerk tag. Energization of L20 also closes L20ac2 (Fig. 39B), thereby completing an energizing circuit for the solenoid L20. This energizing circuit is from the conductor 1304, through contacts SP24b2; TD20bc1; L20ac2; SC23a1; SC37b1; L22bc1; and K21b13; the solenoid L20; and the contacts SC61a1 and SC60b1 to energize the solenoid L20. If the tag has been properly positioned in the media reader, the alining pins will move through the openings in said tag and cause the contacts SC20ac1 (Fig. 39C) to close, thus applying potential to the clamp and sensing switch solenoid L21 (Fig. 39C), which actuates the clamping block 181 (Fig. 5A) to clamp the clerk tag, holding it firmly in place, and also applying potential to the time-delay relay TD20 to simultaneously energize said relay. The TD20 relay is connected in parallel with the solenoid L21, and, in the event the circuit through the solenoid L21 is maintained for an excessive length of time, the solenoid TD20 will operate various contacts for controlling the energizing circuits for the solenoid L21 and the relay TD20. It will be recalled that a linkage comprising the lever 292 (Fig. 31), the link 308, and the lever 416, between said solenoid and the arm 414, also releases said arm upon the energization of solenoid L21 to release the five sensing wires which control the contacts SC25a1, SC26a1, SC27a1, SC28a1, and SC29a1 (Fig. 39B).

Energization of the clamp and sensing switch solenoid L21 also causes the contacts L21ac1 (Fig. 39B) to close and the contacts L21bc1 (Fig. 39C) to open, thereby interrupting a circuit over the contacts SC33b2, which deenergizes a contactor relay (not shown) in the recorder. Deenergization of this contactor relay causes contacts (not shown) in the A.C. section of the system-operating circuit to close to supply power to the media reader and recorder motors, and also causes the contacts K3ac11 (Fig. 39B) to open to interrupt the original energizing circuit to the solenoid L20, said relay now being energized through the contacts SP24b2 and L20ac2. In addition, further contacts (not shown), controlled by this relay, close to prepare the recorder punch apparatus for operation.

To initiate operation of the media reader, therefore, the Charge key of the cash register must have been operated, the clerk tag must be properly inserted into the reader, and said tag must have a hole in the clerk position of its identification section. Movement of the corresponding sensing wire, through this hole, causes the contacts SC25a1 to close, thereby completing a circuit from the conductor 1304 through the contacts L21ac1; SC25a1; SC21b1; and SS20a2 (position 1) and the read relay K22, to energize said relay.

Energization of the relay K22 closes the contacts K22a1 and K22a2 (Fig. 39B) to complete a circuit over the contacts K22a1; L20ac2; SC23a1; SC37b1; and K22a2; the solenoid L20; the contacts SC61a1; and the contacts SC60b1 for energizing the solenoid L20. This circuit also replaces the original L20 energizing circuit, interrupted by the opening of contacts K3ac11 of the previously-mentioned contactor relay.

Energization of K22 also closes K22a12 (Fig. 39B), completing a circuit from conductor 1304 through the contacts K22a12; the contacts SC33b1 of the media reader, which are closed in the home and No. 1 position of the media reader cam line; the contacts SC35b2, which are open from ten degrees to two hundred and fifty degrees of the revolution of the media reader clutch; and the media reader clutch solenoids L22A and L22B to energize said solenoids.

Energization of the clutch solenoids L22A and L22B opens the contacts L22bc1 in the L20 energizing circuit, said circuit being completed through the now-closed contacts K22a2. The contacts SC35b2 are closed to complete a shunt circuit across a 2,000-ohm resistor 1317, and thus provide a high energizing voltage for the solenoids L22A and L22B. Subsequent removal of the shunt from across the resistor 1317 allows the resistor to become effective to reduce the current through the solenoids L22A and L22B to a lesser value required to maintain them in energized condition, thereby minimizing the danger of overheating of the solenoids.

In the event that the wrong tag is inserted into the media reader, the sensing wire for the contacts SC25a1 will not be able to come forward, since no hole will be positioned opposite said sensing wire in the identification section of the tag. Therefore, the contacts SC25a1 will not close, the read relay K22 will not be energized, and the media reader clutch solenoids L22A and L22B will not be energized for initiation of operation of the media reader. Means which will be described subsequently and which are controlled by the push button 490 (Fig. 1) are provided to enable the manual release of an erroneously-inserted tag.

Assuming now that the correct tag has been inserted into the media reader and that the contacts SC25a1 have closed to complete an energizing circuit to the relay K22, which energizes the media reader clutch solenoids L22A and L22B, the clutch will be engaged to couple the cam line to the media reader motor. As has been previously disclosed, the clutch employed for coupling the media reader cam line to its operating motor 333 is of the single-revolution type, which is tripped by solenoids L22A and L22B, to cause the clutch to cycle for a single revolution to couple the cam line to the motor. Upon completion of the single revolution, the clutch is disengaged, thereby disengaging the cam line from the motor unless the solenoids L22A and L22B have been energized a second time. As has been explained previously, no reading operation of the media reader takes place on the first revolution of the cam line following insertion of a tag, since this is simply a delaying revolution to provide time for the various components of the media reader to assume their correct positions for reading of the tag.

During the first cycle of operation of the clutch, the media reader cam line is moved from its home position to its No. 1 position. Since the contacts SC33b1 remain closed in both home and No. 1 positions of the media reader cam line, the circuit to the media reader clutch solenoids L22A and L22B remains completed and energizes said solenoids to cause the clutch to cycle again to engage the media reader motor with the media reader cam line for another revolution of said cam line.

During the second clutch cycle, in which the media reader cam line is moved from its No. 1 position to its No. 2 position, a symbol is punched on the recording tape to identify the type of tag being read. Each tag is represented by a particular symbol. Punching of this symbol may be accomplished through one or both of two different means, depending upon the type of application in which the recording system is being used. Customarily, only one of these two means will be used for the punching of a tag identification symbol on the recording tape, and the other of the means may then be used for some other purpose. One example of a purpose for which the other of the two means might be adapted is that of punching supplementary special symbols at desired points in the reading of the tag. These supplementary symbols could, for example, constitute intermediate reset signals in a tape-to-card converting system. Also, if desired, one of the two means could be used to cause punching of an end-of-tag symbol in the tape, while the other was used for the punching of a tag identification symbol, or for some other purpose if the tag identification symbol is not deemed necessary.

One of the two available means for causing punching of a tag identification symbol in the tape includes the contacts SC34a2 (Fig. 39D), which close during the time the media reader cam line is in its second position, and contacts SC35a1 (Fig. 39D), which are closed from 5 degrees to 130 degrees of each revolution of the media reader clutch. The closing of contacts SC34a2 is effective in applying a potential from the conductors 1304 to the wiper of the selector switch contacts SS20a5 over the closed contacts K22a11. At this point in the transaction, the wiper is in its No. 1 position, and the circuit, therefore, extends through a corresponding conductor in a cable to a terminal located in a program board (not shown) in the recording system, whence a circuit is completed through a conductor in a cable 1325 to the diode symbol encoding board 1311 (Fig. 39D). Diodes are used in connecting the various rows of terminals of the diode symbol encoding board 1311 to any one of the punch-selecting magnets PS1–PS8 (Fig. 39D). This circuit is completed to the conductor 1305 over the closed contacts SC35a1. For a detailed description of the circuitry used in performing this punching of an appropriate identification symbol for the clerk tag, reference may be had to the previously-cited United States patent application, Serial No. 622,591, of Richard L. Ditmer et al.

The second of the two available means for causing punching of a tag identification symbol in the recording tape includes the media identification contacts SC25a2, SC26a2, SC27a2, SC28a2, and SC29a2 (Fig. 39D). Each of these contacts is representative of a different tag. These contacts are under the joint control of the five previously described sensing wires, which control the contacts SC25a1 to SC29a1 inclusive (Fig. 39B) and of the adjustable cam 357 (Fig. 21) on the media reader cam line. As has been described, the cam 357 may be so adjusted on the media reader cam line that the dwell portion of said cam can be changed in relative position to the remainder of the cam line. Therefore, for any of the contacts SC25a2 to SC29a2 inclusive to close, the corresponding sensing wire must be permitted to shift forward by having a hole in the tag which is being read positioned opposite said sensing wire, and the dwell portion of the cam 357 must be in operative relation to the actuating means for the contacts SC25a2 to SC29a2 inclusive. It will be seen that the cam 357 may be adjusted on the cam line 359 so that this dwell portion will come into operative engagement with the actuating means for the contacts at any desired time in the reading operation. For purposes of illustration, it will be assumed that the cam 357 is so positioned on the media reader cam line that the appropriate one of the contacts SC25a2 to SC29a2 will close to permit an identification-symbol-punching operation during the second revolution of the media reader clutch.

In the operation being described, in which a clerk tag has been inserted into the media reader, the contacts SC25a2 will be closed. These contacts are effective in cooperating with contacts K22a11, now closed due to the energization of read relay K22, to apply potential from the conductor 1304 over K22a11; SC25a2; through a corresponding conductor in a cable 1327 to a terminal located on a program board (not shown) in the tape recorder. Each of the contacts SC25a2 to SC29a2 is connected to the program board over a separate conductor in the cable 1327, so that any one of the different punch-selecting magnets PS1–PS8 (Fig. 39D) may be energized upon the closing of any one of the contacts. The circuit is continued through a conductor in a cable 1325 (Fig. 39D) to the "2" row of the diode symbol encoding board 1311 (Fig. 39D). A diode may be used to connect this row to a conductor connected in turn to the punch-selecting magnet PS8. This circuit is completed to the conductor 1305 over the closed contacts SC35a1, which, as has been stated, are closed from 5 degrees to 130 degrees of each revolution of the media reader clutch. Energization of the punch-selecting magnet PS8, through the circuit described above, causes a hole to be punched in channel 8 of the recording tape for identification of the clerk tag.

After the second revolution has been initiated, the contacts SC33b1 (Fig. 39B), which are closed in the home and No. 1 positions of the media reader cam line, will open, and the contacts SC33a3 (Fig. 39B), which are open in the home and No. 1 positions of the media reader cam line, will close. The contacts SC4ac1 (Fig. 39B), which are positioned on the cam line of the recorder, are closed between 215 degrees and 310 degrees of the punching cycle and are thus closed at the completion of the actual punching operation. A circuit is completed from the conductor 1304 through the recorder contacts K6b11; the contacts SC4ac1; and the now-closed contacts SC33a3 (Fig. 39B) to the media reader clutch solenoids L22A and L22B, to trip the media reader clutch to make a third cycle. The third and following cycles of the media reader clutch effect rotation of the media reader cam line through successive increments, so that successive cams on the cam line release their corresponding set of five sensing wires for the reading of successive columns on the tag. The holes in each column of the tag permit corresponding sensing wires to come forward and close the corresponding ones of the reader contacts SC36a1 to SC36a5 (Fig. 39D). As the actuating contacts SC35a1 (Fig. 39D) close at five degrees of each revolution of the media reader clutch, a circuit is completed from conductor 1304; over the contacts K22a11; the ones of the contacts SC36a1 to SC36a5 which are closed; and the corresponding conductors in a cable 1335 to terminals in the section 1336 of the diode digit encoding board 1315. Jumper wires are used to connect these terminals to terminals connected to conductors which, in turn, are connected to the punch-selecting magnets PS1 to PS8. The jumper wire 1337 in Fig. 39D connecting terminals 1338 and 1339 is shown as an example of such a wire. The circuit is completed through contacts SC35a1 to the conductor 1305, as previously described. Energization of the selected ones of the punch-selecting magnets PS1 to PS8, inclusive, closes contacts (not shown), completing a circuit to the punch clutch magnets located in the tape recorder. A punching cycle is thus effected, and, at 215 degrees of the operation of the punching mechanism, the answer-back contacts SC4ac1 (Fig. 39B) are closed to complete an energizing circuit to energize the media reader clutch solenoids L22A and L22B to trip the media reader clutch for a further cycle of operation.

The cams on the cam line of the media reader are so designed that the dwell portion of each cam which causes release of the sensing wires for the digit to be read comes into sensing-wire-releasing position shortly before the end of the previous revolution of the media reader clutch, so that the reader contacts SC35a1 will close to complete the proper circuits at the beginning of the clutch revolution in which the digit is read. Since each clutch cycle is initiated by completion of the circuit to the media reader clutch solenoids L22A and L22B, through the contacts SC4ac1 (Fig. 39B) on the recorder cam line, each subsequent reading operation must await the proper recording of the preceding reading operation. This reading process continues until all of the information on the tag has been read by the media reader and recorded by the recorder.

As the reading of the tag approaches its conclusion, a reset operation is employed to rotate the media reader cam line back to its home position, in preparation for the next tag-reading operation. This reset operation is set up by the opening of the end-of-tag contacts SC21b1, SC22b1, SC30b1, SC31b1, and SC32b1 (Fig. 39B) for the tag which has just been read. In this case, it is the clerk's tag which has just been read, and, therefore, the clerk end-of-tag contacts SC21b1 will be effective on opening. The end-of-tag contacts are located on the media reader cam line and are designed to open at a particular time in the reading cycle, depending upon the length of the tag being read. Opening of the end-of-tag contacts SC21b1 interrupts the circuit to the read relay K22, causing said relay to be deenergized. The deenergization of K22 opens the contacts K22a1 and K22a2 in the alining pin and reset solenoid L20 energizing circuit, said solenoid now being energized through the contacts L22bc1 and SC33a4. Upon the subsequent closing of contacts SC4ac1, the media reader clutch solenoids L22A and L22B will be energized to trip the media reader clutch for a further cycle. Energization of the media reader clutch solenoids L22A and L22B opens the contacts L22bc1, thereby deenergizing the alining pin and reset solenoid L20. This causes the alining pins to be withdrawn from the alining holes in the clerk's tag. Withdrawal of the alining pins causes the contacts SC20ac1 (Fig. 39C) to open. Opening of the contacts SC20ac1 interrupts the circuit to the clamp and sensing switch solenoid L21 and the time delay relay TD20, thus causing both the solenoid and the relay to deenergize. Deenergization of the solenoid L21 withdraws the clamp from the tag, allowing the tag to be ejected from the media reader. Deenergization of the solenoid L21 causes the contacts L21ac1 to open and the contacts L21bc1 (Fig. 39C) to close.

Closing of the contacts L21bc1 completes an energizing circuit to the media reader clutch solenoids L22A and L22B from the conductor 1304 through the contacts L21bc1; the contacts SC33a3, which are closed except in the home and No. 1 positions of the media reader cam line; and the contacts SC35b2 to the media reader clutch solenoids L22A and L22B. This energizing circuit will retain said clutch solenoids in an energized condition after the answer-back contacts SC4ac1 open, as the punch mechanism of the recorder completes its cycle. The media reader clutch is thereby held in an engaged condition, so that the motor and the cam line of the media reader remain coupled until the cam line has moved sequentially to its thirty-sixth, or home, position. During the thirty-sixth revolution of the media reader clutch, the contacts SC33a3, which, it will be recalled, are open in home and No. 1 positions of the media reader cam line, open, to deenergize the solenoids L22A and L22B, and the media reader clutch disengages the media reader cam line from the motor at the end of the thirty-sixth revolution, which positions the media reader cam line in its home position. Also during the thirty-sixth revolution of the media reader clutch, the contacts SC33b2 (Fig. 39C) and SC34b2 (Fig. 39A) close. Closing of the contacts SC33b2 (Fig. 39C) completes an energizing circuit to a recorder relay (not shown), the energization of which opens an associated contact, deenergizing the media reader motor 333 (Fig. 39B).

In order to enforce a certain sequence of operation in th recorder transaction, it is necessary to move the sequence selector switch 518 (Fig. 32) to its next position as a result of the reading of the clerk tag. Following the recording of the data from the clerk's tag, the contacts SC34a1 (Fig. 39D) close when the cam line is in the thirty-fourth position during a resetting operation. This completes a circuit to the sequence selector switch SS20 from the conductor 1304; contacts SC34a1; K21bc12; and SS20a8 (position 1); the conductor 1318; the normally-closed contacts SC46bc1 (Fig. 39C); and the contacts SS20a4 (position 1) to energize the selector switch solenoid SS20. Upon the opening of the contacts SC34a1, the selector switch solenoid SS20 is deenergized. the sequence selector switch 518 (Fig. 32), comprising the various sets or levels of contacts SS20a1 to SS20a8 inclusive, employed in the present invention, is of the type which is caused to step to its next position upon the deenergization of its solenoid. Therefore, deenergization of the solenoid SS20 causes the selector switch to step to its next position, which in this case is position No. 2.

In the event that the clerk's number is entered by means of the cash register rather than by means of the media reader, the recording operation is initiated by depression of the Clerk's key on the cash register keyboard. Depression of the Clerk's key closes the contacts SC59a1 (Fig. 39A), which completes an energizing circuit to the key lock line trip solenoid L40 from the conductor 1304 through the contacts K21b2; L20b1; and SC34b2, which are closed in the home and No. 1 positions of the media reader cam line; contacts SC59a1; SC50a1, which close when any key of row 1 of the cash register keyboard is fully depressed; the solenoid L40; and the contacts K1b13, which are recorder interlock contacts designed to close upon completion of the previous cycle of operation of the recorder, to energize the key lock line trip solenoid L40. Operation of the cash register causes the contacts SC46ac1 (Fig. 39C) to close and the contacts SC46bc1 to open.

The closing of the contacts SC46ac1 completes a circuit from the conductor 1304 through the contacts SS20bc13; the contacts SC44b2, controlled by the total lever of the cash register (not shown); the contacts SC46ac1; the contacts SS20a4 (position 1); and the solenoid SS20, to energize said solenoid. This causes the interrupter contacts SS20bc13 to open, thereby deenergizing the solenoid SS20 and causing the selector switch 518 to step to position 2. The previously-mentioned opening of the contacts SS46bc1 prevents a circuit from being completed through the contacts SC46ac1, SC46bc1, and SC47ac1 to position 2 of the contacts SS20a4 for re-energization of the solenoid SS20 at this time.

As the next step in the operation sequence being described, a customer identification tag is inserted into the media reader in order that a record of the account number of the customer in this transaction will be punched on the tape. Insertion of the customer tag causes the contacts SC23a1 (Fig. 39B) to close, which completes an enrgizing circuit from the conductor 1304 to the alining pin and reset solenoid L20 (Fig. 39B) through contacts K3ac11, controlled by a recorder contactor relay; the conductor 1316; the contacts K20bd1, SP24b1, and SC23a1; the "non-repeat" contacts SC37b1; L22bc1; and K21b13; the solenoid L20; the contacts SC61a1, which have been closed by depression of the Charge key in row 9 of the cash register; and the normally-closed contacts SC60b1.

As has been previously described in connection with the description of the reading of the clerk tag, energization of the alining pin and reset solenoid L20 causes the alining pins to move forward and engage corresponding alining holes in the customer tag. The clamp and sensing switch solenoid L21 is then energized to clamp the customer tag to hold it firmly in place and also to permit release of the five identification sensing wires which control the contacts SC25a1 to SC29a1 (Fig. 39B). Also, as has been described previously, power is supplied to the media reader and recorder motors at this time.

If the correct tag—i.e., a customer tag— has been inserted into the media reader, a circuit will be completed through the contacts SC29a1 (Fig. 39B), which will close by virtue of the registering of the sensing wire connected thereto with a hole in the customer tag which is to be read. This circuit will extend from the conductor 1304 through the contacts L21ac1; SC29a1; SC22b1; SS20a2 (position 2) and the read relay K22, to energize said relay. As has been previously described in connection with the description of the reading of the clerk tag, energization of the read relay K22 provides a holding circuit for the alining pin and reset solenoid L20 and also provides an energizing circuit for the solenoids L22A and L22B of the media reader clutch, the energization of which trips the clutch to couple the media reader motor with the media reader cam line. Punching of an identification symbol utilizing the contacts SC29a2 and reading of the customer tag will then take place in the same manner as has been described for the reading of the clerk tag, and will continue until the reading of a customer tag has been completed.

Upon the completion of the reading of all of the information from the customer tag and the punching of this information on the tape, a resetting operation takes place, which is initiated by the opening of the customer end-of-tag contacts SC22b1 (Fig. 39B). This interrupts the circuit to the read relay K22, causing said relay to be deenergized. The resetting operation is then carried out in a manner which has previously been described in connection with the reading of the clerk tag.

In order to enforce the correct sequence of operation following the reading of the customer tag, it is necessary to move the selector switch 518 (Fig. 32) to its next position, which in this case is its third position. Following the reading of the customer tag, when the contacts SC34a1 (Fig. 39D) close during the thirty-fourth revolution of the media reader cam line, a circuit is completed through the contacts K21bc12; SS20a8 (position 2); the conductor 1318; contacts SC47ac1 (Fig. 39C), which are closed by depression of the Charge key on the cash register keyboard (it will be recalled that, since this is a charge transaction, the Charge key was initially depressed); and the contacts SS20a4 (position 2), to energize the selector switch solenoid SS20.

In the event that the customer number is entered by means of the cash register rather than the media reader for recording, as disclosed in the above-cited United States patent application, Serial No. 622,591, of Richard L. Ditmer et al., operation of the cash register causes the contacts SC43a2 (Fig. 39C) to close, which completes a circuit from the conductor 1304 through the contacts SS20bc13; SC44b2; SC43a2; SS20a4 (position 2); and the solenoid SS20 to energize said solenoid. This in turn causes the interrupter contacts SS20bc13 to open, thereby deenergizing the solenoid SS20 and causing the selector switch 518 to step from position 2 to position 3.

As the next step in the operating sequence being described, a merchandise tag is inserted into the media reader in order that a description of the merchandise being sold will be punched on the tape following the clerk and customer data. Proper insertion of the merchandise tag causes the contatcs SC23a1 (Fig. 39B) to close, which completes an energizing circuit from the conductor 1304 to the alining pin and reset solenoid L20 (Fig. 39B) through contacts K3ac11, controlled by a recorder contactor relay (not shown); the conductor 1316; the normally-closed contacts K20bd1; the contacts SP24b1; SC23a1; SC37b1; L22bc1; K21b13; the solenoid L20; the contacts SC6121, which have been closed by depression of the Charge key in row 9 of the cash register; and the normally-closed contacts SC60b1.

As has been described previously, in connection with the description of the reading of the clerk and customer tags, energization of the alining pin and reset solenoid L20 causes the alining pins to move forward and engage corresponding alining holes in the merchandise tag, and also causes the contacts SC20ac1 (Fig. 39C) to be closed. The clamp and sensing switch solenoid L21 is energized over the contacts SC20ac1 to clamp the merchandise tag to hold it firmly in place, to close the contacts L21ac1, and also permits release of the sensing pins which control the contacts for the media identification section. Also, as has been previously described, power is supplied to the media reader and recorder motors at this time.

The merchandise tag may have any one of three different predetermined digit lengths, which shall be designated herein as No. 1, No. 2, or No. 3. Each of the three types of tags is identified by a hole in one of three different places in the media identification section of the tag. Therefore, when the five identification sensing pins are released for sensing movement, the pin positioned opposite the hole in an inserted merchandise tag will pass through the hole identifying the particular type of tag and cause its corresponding contacts to close. The contacts SC26a1 (Fig. 39B) are controlled by the sensing wire which will sense an identification hole in the merchandise tag of No. 1 digit length; the contacts SC27a1 are controlled by the sensing pin which will sense an identification hole in the merchandise tag of No. 2 digit length; and the contacts SC28a1 are controlled by the sensing pin which will sense an identification hole in the merchandise tag of No. 3 digit length.

If, for example, a merchandise tag having a No. 1 digit length is inserted into the media reader, upon release of the sensing wires controlling the contacts SC25a1 to SC29a1 inclusive, the contacts SC26a1 will close. A circuit will then be completed through the contacts L21ac1; SC26a1; SC30b1; SS20a2 (position 3); to energize the read relay K22. Energization of the read relay K22 closes the contacts K22a12 (Fig. 39B), completing an energizing circuit to the clutch solenoids L22A and L22B through the contacts K22a12; the contacts SC33b1, which are closed in the home and No. 1 positions of the media reader cam line; and the contacts SC35b2. Energization of the solenoids L22A and L22B trip the clutch for a cycle of operation to effect coupling of the media reader cam line to the media reader motor 333.

At the same time that the clutch solenoids L22A and L22B are energized, a circuit will be completed from the conductor 1304 through the contacts K22a12; K20bd11; SS20a3 (position 3); K21b3; and a merchandise interlock relay K20, to energize said relay, which causes the contacts K20ad11 (Fig. 39B) to close, after which the contacts K20bd11 are caused to open. This completes a holding circuit for the relay K20 from the conductor 1304 over contacts (not shown) controlled by a stepping switch; a conductor 1340; the contacts K20ad11; the contacts SS20a3 (position 3); the contacts K21b3; and the relay K20, to maintain said relay in an energized condition.

It will be recalled that, in the reading of the merchandise tag, the alining pin and reset solenoid L20 was initially energized through contacts K3ac11, controlled by a recorder contactor relay; the conductor 1316; the contacts K20bd1; SP24b1; SC23a1; SC37b1; L22bc1; K21b13; the solenoid L20; the contacts SC6121; and SC60b1. Upon the subsequent energization of K22 and L22A and L22B, contacts K22a2 close, and contacts L22bc1 open. Upon the energization of the relay K20, the contacts K20bd1 open, to interrupt the original energizing circuit, as has been previously stated, thus causing the solenoid L20 to be energized through the contacts K22a1 or SC33a4, which close at 20 degrees of rotation of the media reader clutch. The reading and recording operations performed under control of the merchandise tag are completed with the solenoid L20 energized through these contacts, and are the same as was previously described for the clerk tag and customer tag.

With regard to the punching of an identification symbol for the merchandise tag being read, it will be noted that, if the encoding means is employed which includes the contacts SS20a5 (Fig. 39D), the same identification symbol will be used, regardless of which of the three possible digit lengths the merchandise tag being read may be. On the other hand, if the encoding means is employed which includes the media identification encoding contacts SC25a2 through SC29a2 (Fig. 39D), it is possible to punch different identification symbols for each of the three types of merchandise tags being read (as previously explained), and thus identify the particular type of tag being read.

Upon completion of the reading of all the information from the merchandise tag and the punching of this information on the tape, a resetting operation takes place, which is initiated by the merchandise end-of-tag contacts corresponding to the particular type of tag being read. As may be seen in Fig. 39B, the merchandise end-of-tag contacts for each digit are in series with the corresponding contacts controlled by the tag identification sensing pins. This is to say, the merchandise end-of-tag contacts SC30b1 for merchandise tags of No. 1 digit length are in series with the contacts SC26a1, the merchandise end-of-tag contacts SC31b1 for merchandise tags of No. 2 digit lenth are in series with the contacts SC27a1, and the merchandise end-of-tag contacts SC32b1 for merchandise tags of No. 3 digit length are in series with the contacts SC28a1. Each of the sets of contacts SC30b1, and SC32b1 is controlled by the position of the media reader cam line and is designed to open at a certain point in rotation of said cam line, depending upon the predetermined digit length of each of the three types of merchandise tags. Opening of the merchandise end-of-tag contacts corresponding to the type of tag being read interrupts the circuit to the read relay K22, causing said relay to be deenergized. The resetting operation is then carried out in the manner which has been previously described in connection with the clerk and customer tags.

The function of the merchandise interlock relay K20 is to enforce the use of the cash register component of the recording system following each merchandise-tagreading operation for the registering and recording of data, such as sale price, pertaining to the merchandise. Upon the completion of a register operation, another merchandise tag may be read, so that a transaction may include any desired number of merchandise items. When all of the desired merchandise tags have been read and their corresponding sale prices have been registered by the cash register, a total may be taken, which will cause the selector switch 518 (Fig. 32) to be reset to its No. 1 position in a manner to be described subsequently.

The reading of more than one merchandise tag without first performing an operation of the cash register is precluded by the opening of the contacts K20bd1 (Fig. 39B), which are caused to open by energization of the relay K20. When the contacts K20bd1 are opened, the alining pin and reset solenoid L20 cannot be re-energized after it has once been deenergized, following completion of the reading of the first merchandise tag. This condition is maintained until such time as the relay K20 is deenergized during the recording of the data, which results from a cash register operation.

Energization of the relay K20 also causes opening of the contacts K20bc12 (Fig. 39A) and closing of the contacts K20ac12 (Fig. 39A). It will be seen from an examination of Fig. 39A that opening of the contacts K20bc12 and closing of the contacts K20ac12 conditions the L40 energizing circuit so that the only key on the cash register whose depression will effect the energization of the key lock line trip solenoid L40 is the Amount key, which controls the closing of the contacts SC53a1.

In a merchandise operation of the cash register, the sale price or other desired data is set up on the amount section of the cash register keyboard, and the Merchandise key is depressed. The closing of the contacts SC53a1 by depression of the Amount key completes a circuit from an A.C. conductor 1341 through contacts K21b2; the contacts L20b1, which are closed when the solenoid L20 is deenergized; the contacts SS20a7 (position 3); the normally-closed contacts SS20b14; the contacts SS20a1 (position 3); the contacts K20ac12; the normally-closed contacts SC48bc1, which are controlled by the keys of row 7 and row 8 of the cash register, as disclosed in the previously-cited co-pending application; the contacts SC53a1, controlled by the Amount key; the contacts SC50a1, which close when any key in row 1 of the cash register is fully depressed; the solenoid L40; and the contacts K1b13, which are recorder interlock contacts designed to close upon completion of the previous cycle of operation of the recorder, to energize the key lock line trip solenoid L40 (Fig. 39A). Energization of the solenoid L40 causes the locking in their depressed position of the keys which are depressed, and also causes a mechanical closing of the contacts SC41a1 (Fig. 39A) to take place to complete an operating circuit for the cash register motor 1300, through said motor, the speed control contacts SC40b1, and the contacts SC41a1, to cause said cash register to cycle. For a fuller and more detailed description of the manner in which the data is set up on the cash register keyboard and then subsequently recorded by the recording system on the tape, reference may be had to the previously-cited United States patent application, Serial No. 622,591, of Richard L. Ditmer et al.

Deenergization of the merchandise interlock relay K20 (Fig. 39B) takes place following initiation of the operation for recording information entered in the cash register. Operation of the recorder results in the energization of a stepping switch (not shown), which energization causes the opening of certain contacts (not shown) controlled by it, in the previously-described holding circuit for the relay K20, thereby interrupting the said circuit and deenergizing the relay K20. For a detailed description of the above circuit, reference may be had to the co-pending United States patent application of Richard L. Ditmer et al., Serial No. 622,591.

The contacts K20bd1 (Fig. 39B) close upon deenergization of the relay K20, and an additional merchandise tag may be read by the media reader, if desired, upon completion of the recording of the information entered into the cash register. Also, the contacts K20bc12 (Fig. 39A) close, and any of the Deposit, Discount, Tax, or Miscellaneous keys of row 1 of the cash register, controlling contacts SC52a1, SC53a1, SC57a1, and SC56a1, respectively, may now be used to initiate operation of the cash register in the event such an operation is appropriate.

It will be seen that, in a transaction which includes more than one merchandise item, the merchandise-tag-reading operation and the associated cash register operation will cause the appropriate information for each subsequent merchandise item to be recorded in the same manner as previously described for the single item of merchandise.

The charge transaction being described is concluded by the taking of a total of the one or more merchandise items of the transaction. In the taking of a total, depression of the operating bar 756 (Fig. 1) on the cash register causes the contacts SC45a1 (Fig. 39A) to close, thus completing a circuit from the A.C. conductor 1341 to the key lock line trip solenoid L40. Energization of the solenoid L40 causes the contacts SC41a1 (Fig. 39A) to close, thereby initiating a total-taking operation of the cash register. For a detailed description of the manner in which the cash register is operated for a total-taking operation, and the manner in which appropriate data pertaining to said operation is recorded by the recording system in the tape, reference may be had to the previously-cited United States patent application, Serial No. 622,591.

The taking of a total in a charge operation also causes the sequence selector switch 518 (Fig. 32) to be moved back to position 1, so that it is properly positioned for the beginning of the next transaction.

Depression of the operating bar 756 (Fig. 1) on the cash register for the initiation of a total-taking operation closes the contacts SC45a2 (Fig. 39C) to complete a circuit from the conductor 1304 through the contacts SS20a6 (position 3); SC44b2; SC45a2; SS20a4 (position 3); and the selector switch solenoid SS20, to energize said solenoid. Subsequent cycling of the cash register opens the contacts SC45a2 to interrupt the previously-mentioned circuit, thereby deenergizing the selector switch solenoid SS20, which causes the selector switch 518 to step back to its No. 1 position. It is possible that, in some applications of the recording system, it would be desired to omit any recording of a customer number, whether by means of a customer tag or by means of manual indexing of the customer number on the register keyboard and depression of the Customer Number key. Such an application might, for example, be used in an establishment where customer identification is established by writing or mechanical printing on a sales slip and where the punched tape is used merely for inventory purposes. The enforcement of the recording of a customer number can be eliminated in the present system by connecting two terminals 1399 and 1400 (Fig. 39C) by means of a plugboard connector such as the connector 1401. The terminals 1399 and 1400 may, if desired, be located on a program board in the recording system. Connection of the terminals 1399 and 1400 by the connector 1401 completes a circuit from the conductor 1304 through the interrupter contacts SS20bc13, the contacts SC44b2, the connector 1401, the contacts SS20a5 (position 2), and the selector switch solenoid SS20, for energization of said solenoid SS20. Therefore, it will be seen that, when the selector switch 518 is stepped from position 1 to position 2, said solenoid will be re-energized, causing the interrupter contacts SS20bc13 to open, and causing the selector switch 518 to step immediately to position 3 for a merchandise-recording operation. It is, therefore, seen that a customer-number-recording operation is eliminated when the connector 1401 is connected between the terminals 1399 and 1400.

With the selector switch in position 3, the recording of the charge transaction is completed in the same manner as has been previously described, by the reading of one or more merchandise tags and entry of the corresponding sale prices for each through the cash register, any necessary deposit, discount, tax, or miscellaneous operations, and a subsequent total-taking operation, which is effective to step the selector switch 518 back to position 1 in preparation for the commencement of the next complete transaction.

Position 2 of the selector switch 518 is also stepped past in a cash transaction involving the recording system, because in such a transaction there is no need for customer identification. In a cash transaction, the contacts SC47bc1 (Fig. 39C), which are opened by depression of the Charge key on the cash register keyboard in a charge transaction, remain closed. Therefore, when the wiper of the contacts SS20a4 reaches position 2, a circuit is completed from the conductor 1304 through the interrupter contacts SS20bc13 (Fig. 39C); the contacts SC44b2; SC47bc1; SS20a4 (position 2); and the solenoid SS20, to energize said solenoid. This causes the interrupter contacts SS20bc13 to open, to deenergize said solenoid and step the selector switch 518 to position 3. With the selector switch 518 in position 3, merchandise data is recorded in the same manner as has been described for a charge transaction.

Tag release and homing means

Manually-controlled push button means are provided on the media reader for the release of any tag which has been inserted into the machine, engaged and alined by the alining pins, and clamped by the clamp and sensing switch solenoid L21, but which has been placed in the media reader in an improper sequence of operation, as, for example, where a merchandise tag is placed in the media reader before a clerk or customer tag has been placed therein for reading. In such an event, the closing of one of the identification sensing switches SC25a1 to SC29a1 inclusive will not complete a circuit, and the tag will not be read. Depression of the push button 490 (Fig. 1) causes the contacts SP24b1 (Fig. 39B) and SP24b2 (Fig. 39B) to open, thus interrupting the energizing and holding circuit for the alining pin and reset solenoid L20. This deenergizes the solenoid L20, which causes the alining pins of the media reader to be withdrawn from the tag. Withdrawal of these alining pins causes the contacts SC20ac1 (Fig. 39C) to open, thereby deenergizing the time delay relay TD20 and the clamp and sensing switch solenoid L21, which, in turn, releases the tag, so that it may be removed from the media reader and the correct tag inserted for reading. However, once reading of the tag has been commenced, as it will be automatically when the correct tag is inserted into the media reader, the push button 490, controlling the contacts SP24b1 and SP24b2, is ineffective to cause release of the tag, since the energizing circuit for the solenoid L20 by-passes the contacts SP24b1 and SP24b2 through either of the contacts K22a1 (Fig. 39B) or SC33a4, which is closed in all positions except in the home and No. 1 positions of the media reader cam line.

Selector switch homing by total-taking

In the event that, through error or inadvertence of the operator, a tag reading has been made and the selector switch 518 has been stepped to position 2, said switch may be stepped through position 3 to home position by use of the total-taking means on the cash register component of the recording system. In order to accomplish the stepping of the selector switch 518, the operating bar 756 of the cash register is depressed, thus closing the contacts SC45a3 (Fig. 39C). The closing of the contacts SC45a3 completes a circuit to the selector switch solenoid SS20 through the interrupter contacts SS20bc13 (Fig. 39C); the contacts SS44b2, which are closed only in "add" and "total" positions of the cash register's total control lever (not shown); the contacts SC45a3; the contacts SS20a4 (position 2); and the solenoid SS20. As the solenoid SS20 is energized, it causes the interrupter contacts SS20bc13 to open, thereby deenergizing said solenoid and causing the selector switch to be stepped to position 3. A circuit is then completed through position 3 of the contacts SS20a6; the contacts SC44b2; the contacts SC45a2, which are closed by depression of the operating bar in the same manner as the previously mentioned contacts SC45a3; the contacts SS20a5 (position 3); and the solenoid SS20, to energize said solenoid. The solenoid SS20 will remain energized until the operator releases the operating bar 756, thus causing the contacts SC45a2 to open, which will interrupt the circuit to the solenoid SS20 to cause deenergization of said solenoid, with the consequent result of the stepping of the selector switch 518 to its No. 1, or home, position.

Automatic-void

In the event the punch mechanism of the tape recorder 100 (Fig. 1) fails to operate, thereby preventing the completion of the reading of the tag, an error-detecting operation takes place, in which the media reader is stopped, the tag is automatically ejected from the media reader, and a "Void" symbol is punched in the paper tape, indicating that such a failure has occurred.

As explained earlier, at 215 degrees of the operation of the punching mechanism, the answer-back contacts SC4ac1 (Fig. 39B) close to complete an energizing circuit to the media reader clutch solenoids L22A and L22B to trip the media reader clutch for a further cycle of operation. Upon a failure of the punching mechanism to operate, the contacts SC4ac1 will fail to close, which prevents the media reader clutch solenoids L22A and L22B from being energized, resulting in the suspension of the media reader operation. This stopping of the media reader operation constitutes a notice to the operator and to the media reader that a punching failure has occurred in the reading of the tag.

It will be recalled that, simultaneously with the energization of the clamping solenoid L21, a time delay relay TD20 was also energized. After a predetermined length of time has elapsed, the time delay relay TD20, which is normally deenergized at the completion of a reading operation which occurs before the length of time necessary to actuate the relay has elapsed, will operate to close the contacts TD20ac1 (Fig. 39B) and open the contacts TD20bc1 (Fig. 39B). Closing of the contacts TD20ac1 completes an energizing circuit to the auto-void relay K21 (Fig. 39B) from the conductor 1304; through the contacts K22a1, which are closed due to the read relay K22 being energized at the present time; and the contacts TD20ac1 to the auto-void relay K21.

Closing of the contacts TD20ac1 completes an additional energizing circuit to the auto-void relay K21 through the contacts SC33a4 (Fig. 39B), which are closed in all positions of the media reader cam line except in the home and No. 1 positions; and the contacts TD20ac1.

Opening of the contacts TD20bc1 upon the operation of the time delay relay TD20 opens a holding circuit through the solenoid L20, which solenoid is now held energized through the contacts K22a1 (Fig. 39B); L20ac2; SC23a1; SC37b1; K22a2; K21b13; the solenoid L20; and the contacts SC61a1 and SC60b1. This conditions the L20 energizing circuit to be controlled by the relay K21 as disclosed below.

Energization of the auto-void relay K21 opens the contacts K21b13 (Fig. 39B); K21b3 (Fig. 39B); K21b2 (Fig. 39A); K21bc12 (Fig. 39D); and closes the contacts K21ac12 (Fig. 39D); K21a1 (Fig. 39C); and K21a11 (Fig. 39B).

The closing of the contacts K21a11 establishes an energizing circuit for the auto-void relay K21 from the conductor 1304; contacts K22a1; K21a11 to the relay K21. Closing of the contacts K21a1 completes a by-pass circuit of the parity check relay K6 (Fig. 39C), thereby disabling the parity check from operating. This is necessary, since an operation of the parity check will normally lock up the recording mechanism so as to prevent further operation. For a detailed description of the manner in which the parity check operates, reference may be had to the previously-cited co-pending United States patent application, Serial No. 622,591, of Richard L. Ditmer et al.

Closing of the contacts K21ac12 conditions a circuit for the punching of a "Void" symbol, which will be described hereinafter. The opening of the contacts K21bc12 in the selector switch solenoid SS20 energizing circuit prevents the energization of said solenoid when the contacts SC34a1 (Fig. 39D) close at the time the media reader cam line is in its thirty-fourth position. As a result, the sequence selector switches SS20a1 to SS20a8 will not be stepped to their next position. This condition forces the operator to complete a recording of the information required, either by a rereading of the tag or by the manual indexing of such information on the keyboard of the cash register.

The opening of the contacts K21b2 prevents the energization of the key lock line trip solenoid L40 (Fig. 39A). This condition prevents the operation of the cash register while the automatic-void operation is in progress.

The opening of the contacts K21b3 releases the merchandise tag interlock relay K20 (Fig. 39B). This allows for a rereading of the tag by the media reader.

The opening of contacts K21b13 deenergizes the alining pin and reset solenoid L20 (Fig. 39B). Withdrawal of the alining pins from the tag due to the deenergization of the solenoid L20 opens the contacts SC21ac1 (Fig. 39C), thereby deenergizing the clamp solenoid L21 and the time delay relay TD20. The removal of the clamp from the tag upon the deenergization of the solenoid L21 allows the tag to be ejected automatically and opens the contacts L21ac1 (Fig. 39B), which deenergizes the read relay K22. The deenergization of the time delay relay TD20 closes TD20bc1, completing a K21 energizing circuit through the contacts SP24b2; TD20bc1; and K21a11 to the solenoid K21. The deenergization of TD20 also opens the contacts TD20ac1 in the original K21 energizing circuit.

Deenergization of the clamp solenoid L21 also closes the contacts L21bc1 (Fig. 39C), completing an energizing circuit to the clutch solenoids L22A and L22B through the contacts L21bc1 (Fig. 39C); contacts SC33a3, which are open in the home and No. 1 positions of the cam line; and contacts SC35b2, which are open only from 10 degrees to 250 degrees of the media reader clutch revolution.

Energization of the clutch solenoids L22A and L22B trips the clutch for rotation of the cam line towards its home position in a resetting operation. When the cam line reaches the thirty-fourth position, the contacts SC34a1 (Fig. 39D) close.

The closing of the contacts SC34a1 is effective in applying a potential from the conductor 1304 over the contacts K21ac12 and a cable in the conductor 1340 to a terminal 1358 in the section 1335 of the diode digit encoding board 1315. As previously described, jumper wires are used to connect these terminals to other terminals, which are connected to the punch-selecting magnets PS1 to PS8 (Fig. 39D). The jumper wire 1337 in Fig. 39D, connecting terminals 1338 and 1339, is shown as an example of such a wire. The circuit is completed through contacts SC35a1 to the conductor 1305.

Energization of the selected ones of the punch-selecting magnets PS1 to PS8 inclusive closes contacts (not shown), completing a circuit to a punch clutch magnet for the punching of a "Void" symbol in the tape. For a detailed description of the circuitry used in this punching operation, reference may be had to the previously-described United States patent application, Serial No. 622,591.

When the cam line reaches its home position, contacts SC33a4 (Fig. 39B) will open, interrupting an energizing circuit to the auto-void relay K21. The relay K21 remains energized through contacts SP24b2; TD20bc1, closed due to the deenergization of the time delay relay TD20; and K21a11. The energized condition of the auto-void relay K21 prevents any further operation of the media reader. This locked condition of the media reader gives further notice to the operator that an operational failure of the recording mechanism has occurred.

To complete the recording of the information required, either by a rereading of the tag or by the manual indexing of the cash register keyboard, as previously described, the media reader or the cash register must be conditioned for a further operation. This is accomplished by the operator's depressing the release button 490 (Fig. 1) on the media reader. Depression of this button opens the contacts SP24b2 (Fig. 39B), which deenergizes the auto-void relay K21. By this manual operation, the operator is forced to recognize that a recording error has occurred.

The deenergization of the auto-void relay closes the contacts K21b13; L21b2; K21b3 and opens the contacts K21a1. Closing of contacts K21b13 (Fig. 39B) provides an energizing circuit for the alining pin solenoid L20 upon the closing of the contacts SC23a1 by the insertion of a tag into the media reader. Closing of the contacts K21b2, K21b3 and the opening of the contacts K21a1 conditions the recording system for a further operation, which may include the use of the cash register keyboard as a data input device, as previously described.

It will therefore be seen that the error-detecting circuit employed herein accomplishes the following: it provides effective notice to the operator that a punching error has occurred; it provides for the punching in the record tape of a symbol indicating the occurrence of such an error, which symbol may be used to control a computer or a tape-to-card converter; and it conditions the media reader for a rereading of the tag or allows the required information to be introduced into the recording system through the use of a cash register keyboard without the necessity of repeating the entire recording sequence. This allows all errors associated with the recording of the media to be corrected at the time of their occurrence, thereby eliminating any possibility of having an incomplete recording of the required media information.

*Interchangeable sequence selector unit*

As has been described in the section of the specification devoted to the mechanical construction of the media reader, certain components of the media reader, including the selector switch 518 (Fig. 32), the selector switch solenoid SS20, certain contacts controlled by energization of said solenoid, etc., are contained in a plug-in unit which may be removed from the media reader and replaced by another unit having components designed to effect a different sequence of operation of the recording system.

In the embodiment of the recording system shown in the circuit diagram and described in the preceding pages, the plug-in unit contains a three-position selector switch 518, so that any complete transaction will include a clerk number operation, a customer number operation, and a merchandise operation, except that the customer number operation may be omitted, if desired, by connecting the terminals 1399 and 1400 (Fig. 39C) in the manner previously described.

In the event that it is desired to apply the recording system to a particular application in which only two distinct operations, such as, for example, customer number and merchandise, are desired in each transaction, the original plug-in unit may be removed, and a plug-in unit containing a selector switch having only two positions may be substituted. The sequence of operations using such a switch will be from position 1 to position 2 and back to position 1, thereby providing sequence enforcement for two separate operations of whatever character is required in the particular application.

Also, it might be desired to use the recording system in an application, such as inventory, in which only one operation is desired in each transaction. Here again, the original plug-in unit may be removed and replaced by one designed for the contemplated application. In this last case, the selector switch may be altogether dispensed with, and the plug-in unit will serve primarily as means for connecting certain of the various leads thereto.

It will be seen that the provision of interchangeable plug-in units, of which the three described above are merely exemplary, permits great flexibility in the uses of the recording system and enables a single recording system to be adapted to a variety of uses merely by changing plug-in units.

While the form of the invention shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. In a recording system for recording data, including a recording mechanism, data entry means including sensing means for reading a record card having data perforated in columns thereon, means actuated by the record card when inserted in said data entry means, and initiating means operable in response to the card-actuated means for initiating an operation of the data-entry means, the combination comprising detecting means for detecting the failure of the recording mechanism to operate, including time delay means having a first part energized upon operation of said initiating means and a second part rendered effective by said energized first part after a predetermined length of time has elapsed, said first part being normally deenergized upon the completion of the reading of said record card within said predetermined time; and means energized in response to an operation of said second part upon failure of said recording mechanism to complete the recording of all data within said predetermined time for conditioning said recording mechanism to record information which is indicative of such failure.

2. In a recording system for recording data, including a recording mechanism of the step-by-step type, data entry means including sensing means for reading a record card having a data perforatted in columns thereon, means normally energized by operation of said recording mechanism for operating said sensing means step by step to read the card column by column and to control the recording mechanism to cause the recording of the data as it is read, means actuated by the record card when inserted in said data entry means, and initiating means operable in response to the card-actuated means for initiating an operation of the data entry means, the combination comprising detecting means for detecting the failure of the recording system to operate, including time delay means having a first part energized upon operation of said initiating means and a second part rendered effective by said energized first part after a predetermined length of time has elapsed, said first part being normally deenergized upon the completion of the reading of said record card within said predetermined time; and means energized in response to an operation of said second part upon failure of said recording mechanism to complete the recording of all data within said predetermined time for energizing said sensing means operating means to control the recording mechanism, whereby information indicative of such failure is recorded.

3. In a recording system for recording a plurality of different classes of data, including a recording mechanism of the step-by-step type for recording said data, means for receiving an insertable record card in reading position, said record card having data perforated in columns thereon, control means actuable by insertion of the card in reading position, means operable to lock the card in reading position and operated by said control means, and means for reading the card column by column and controlling the recording mechanism to cause the recording of the data as it is read, the combination comprising detecting means for detecting the failure of the recording mechanism to operate, including time delay means having a first means energized upon operation of said card-locking means and a second means rendered effective by said energized first means after a predetermined length of time has elapsed, said first means being normally deenergized upon the completion of the reading of said record card within said predetermined time; and means actuated in response to an operation of said second means upon failure of said recording mechanism to complete the recording of all required data within said predetermined time for releasing said locking means, whereby the record card is released from the receiving means to allow for a new reading operation.

4. In a recording system for recording a plurality of different classes of data, including means for reading the different classes of data, means associated with the reading means for recording the data read, sequence control means having a plurality of different control levels settable in concert to a plurality of different positions for controlling the reading of the different classes of data according to a predetermined sequence, control means operated by insertion of a data-bearing member into the reading means, and actuating means operated by said recording means at the completion of a reading operation for advancing said sequence control means step by step from one position to the next, the combination comprising detecting means for detecting an operational failure of the recording means, having a first part energized upon on operation of said control means and a second part rendered effective by said energized first part after a predetermined length of time has elapsed, said first part being normally deenergized upon the completion of the reading of said record card within said predetermined time; and means actuated in response to an operation of said second part upon failure of said recording means to operate for disabling said sequence-control-means-actuating means, thereby preventing the sequence control means from advancing to its next position, thus conditioning the recording system for a re-recording of the same class of data.

5. In a recording system for a plurality of different classes of data, including means for recording said data, first data entry means including first sensing means for reading identification data from a record member, and further sensing means for reading other data from the record member column by column and controlling the recording means for recording of the data which is read, means actuated by the record member when inserted into said first data entry means, initiating means operable in response to the member-actuated means for initiating an operation of the first data entry means, means operable in response to an operation of the initiating means for rendering the first sensing means effective, sequence control means settable to different positions during the recording of different classes of data for enforcing a predetermined sequence of operation, means for causing operation of the further sensing means of the first data entry means controlled by the first sensing means, second data entry means including a plurality of switching means which are settable to represent data and control the recording means to record the data set, and interlock means controlled by the position of the sequence control means and the first sensing means and energized at the start of the operation of the first data entry means for preventing a subsequent operation of the first data entry means until the operation of the second data entry means has occurred, the combination comprising a detecting system for detecting a failure of the recording system to operate during the operation of the first data entry means, including time delay means having a first part energized upon operation of said initiating means and a second part rendered effective by said energized first part after a predetermined length of time has elapsed, said first part being normally deenergized upon the completion of the reading of said record card within said predetermined time; and means actuated in response to an operation of said second part upon failure of said recording mechanism to complete the recording of all data within said predetermined time for controlling the interlock means to allow for a subsequent operation of the first data entry means.

6. In a recording system for recording data, including means for recording said data, first data entry means including means for reading data from a record member and controlling the recording means for recording the data which is read, means actuated by the record member when inserted into said first data entry means, first initiating means operable in response to the member-actuated means for initiating an operation of the first data entry means, and second initiating means operable for initiating operation of the second data entry means, the combination comprising detecting means for detecting a failure of the recording system to operate during the operation of the first data entry means, including time delay means having a first part energized upon operation of said first initiating means and a second part rendered effective by said energized first part after a predetermined length of time has elapsed, said first part being normally deenergized upon the completion of the reading of said record card within said predetermined time; and means energized in response to an operation of said second part upon failure of said recording mechanism to complete the recording of all data within said predetermined time for preventing the operation of said second initiating means, whereby initiation of operation of the sceond data input means is prevented when the detecting means is in operation.

7. In a recording system for recording data, including a recording mechanism of the step-by-step type for recording said data, means for receiving an insertable record card in reading position, said record card having data perforated in columns thereon, means for reading said record card, means for operating said reading means step by step to read the card column by column and to control the recording mechanism to cause the recording of the data as it is read, means actuated by the record card when inserted in said receiving means, and initiating means operable in response to the card-actuated means for initiating an operation of said operating means, the combination comprising detecting means for detecting a failure of the recording system to operate, including time delay means having a first part energized upon operation of said initiating means and a second part rendered effective by said energized first part after a predetermined length of time has elapsed, said first part being normally deenergized upon the completion of the reading of said record card within said predetermined time; and means energized in response to an operation of said second part upon failure of said recording mechanism to complete the recording of all data within said predetermined time for preventing the operation of said initiating means and said operating means, thereby locking up the recording mechanism to provide a warning indication that a failure of the recording mechanism has occurred.

No references cited.